(12) United States Patent
Han et al.

(10) Patent No.: US 11,169,762 B2
(45) Date of Patent: Nov. 9, 2021

(54) ELECTRONIC DEVICE INCLUDING SUB DISPLAY AND METHOD OF OPERATING SAME

(71) Applicant: Samsung Electronics Co., Ltd., Gyeonggi-do (KR)

(72) Inventors: Wooseung Han, Gyeonggi-do (KR); Sangsik Park, Gyeonggi-do (KR); Junghyuck Im, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/906,053

(22) Filed: Jun. 19, 2020

(65) Prior Publication Data
US 2020/0401361 A1 Dec. 24, 2020

(30) Foreign Application Priority Data

Jun. 21, 2019 (KR) .................. 10-2019-0074245

(51) Int. Cl.
*G06F 3/14* (2006.01)
*G06F 3/041* (2006.01)
*G06K 9/00* (2006.01)

(52) U.S. Cl.
CPC ............ *G06F 3/1446* (2013.01); *G06F 3/041* (2013.01); *G06K 9/00604* (2013.01)

(58) Field of Classification Search
CPC ...... G06F 1/1626; G06F 1/1643; G06F 1/165; G06F 1/1658; G06F 1/1686; G06F 1/1692; G06F 1/3209; G06F 1/3218; G06F 1/3265; G06F 1/3287; G06F 3/041; G06F 3/0482; G06F 3/04842; G06F 3/0488; G06F 3/1446; G06K 9/00006; G06K 9/00604; H04M 1/0264; H04M 1/0266
See application file for complete search history.

(56) References Cited

U.S. PATENT DOCUMENTS 6,862,042 B2  3/2005  Lu
7,950,859 B2  5/2011  Zhang et al.
(Continued)

FOREIGN PATENT DOCUMENTS

CN  107682489 A  2/2018
CN  109889630 A  6/2019
(Continued)

OTHER PUBLICATIONS

International Search Report dated Sep. 29, 2020.

*Primary Examiner* — Nelson M Rosario
(74) *Attorney, Agent, or Firm* — Cha & Reiter, LLC

(57) ABSTRACT

The disclosure relates to an electronic device including a sub display. An electronic device according to an embodiment may include a housing, a first display disposed in the housing and including a transparent area, a module assembly disposed under the transparent area and configured to be visible to the outside of the housing, a second display disposed between the first display and the module assembly and configured to cover at least a portion of the module assembly by moving with respect to the first display, a driver configured to move the second display with respect to the transparent area, and a processor configured to move the second display by controlling an operation of the driver in response to an operation of the electronic device.

20 Claims, 20 Drawing Sheets

(56) References Cited

U.S. PATENT DOCUMENTS

2016/0343787 A1* 11/2016 Wu .................... G02F 1/13336
2018/0198896 A1* 7/2018 Kang .................... G06F 1/1652
2019/0394373 A1* 12/2019 Zhang ................ H04M 1/0264
2020/0034100 A1* 1/2020 Fan ...................... G06F 3/1423

FOREIGN PATENT DOCUMENTS

| JP | 2008-011046 A | 1/2008 |
| KR | 10-2014-0132239 A | 11/2014 |
| WO | 2018/161750 A1 | 9/2018 |

* cited by examiner

1

ELECTRONIC DEVICE INCLUDING SUB DISPLAY AND METHOD OF OPERATING SAME

CROSS-REFERENCE TO RELATED APPLICATION(S)

This application is based on and claims priority under 35 U.S.C. 119 to Korean Patent Application No. 10-2019-0074245, filed on Jun. 21, 2019, in the Korean Intellectual Property Office, the disclosure of which is herein incorporated by reference in its entirety.

BACKGROUND

1) Field

One or more embodiments disclosed herein generally relate to an electronic device including a sub display and a method of operating the electronic device.

2) Description of Related Art

As mobile devices can perform not only various functions such as telephone calls and message transmission/reception, but also taking pictures and video, video calls, playback of music and video, and game play, the demand for mobile devices to have a wide display area for users is increasing. Since it is required to dispose a plurality of electronic parts (e.g., camera, LED, etc.) on the front of the mobile device to implement various functions (e.g., front camera function), there is a need to minimize the area that the electronic parts such as cameras and/or LEDs occupy on the front of the mobile device so that the display area of the mobile device can be correspondingly increased.

The above information is presented as background information only to assist with an understanding of the disclosure. No determination has been made, and no assertion is made, as to whether any of the above might be applicable as prior art with regard to the disclosure.

SUMMARY

It has been proposed to apply notch-cut, U-hole, and V-hole displays in order to reduce the area that the electronic parts such as camera and/or LEDs occupy on the front of a mobile device. In such implementations, the electronic parts can be disposed in the notch, U-hole, or V-hole.

However, when notch-cut, U-hole, and V-hole displays are applied to the mobile device, while it is possible to minimize the area that the camera and the LED occupy on the front of the mobile device, it is impossible to completely remove the camera and the LED from the front of the mobile device, so the portion of the front of the mobile device housing the camera and LED cannot be used as part of the display area.

As another plan for reducing the area that the electronic parts such as camera and/or LEDs occupy on the front of the mobile device, it has been proposed to replace the camera and the LED disposed on the front of a mobile device with a pop-up or sliding camera that is exposed from the inside to the outside of the mobile device when needed, for example, when a front image capture application is executed. However, when the camera disposed on the front of a mobile device is replaced with a pop-up or sliding camera, although it is possible to implement a full display, the camera may be damaged or the inside of the mobile device may be contaminated by foreign substance when the camera pops up or slides.

An electronic device according to an embodiment may include: a housing; a first display disposed in the housing and having a transparent area; a module assembly disposed under the transparent area and configured to be shown to the outside of the housing; a second display disposed between the first display and the module assembly and configured to cover at least a portion of the module assembly by moving with respect to the first display; a driver configured to move the second display with respect to the transparent area; and a processor configured to move the second display using the driver, based on an operation of the electronic device.

An electronic device according to another embodiment may include: a housing; a first display disposed in the housing and having a transparent area; a module assembly disposed under the transparent area and configured to be shown to the outside of the housing; a second display disposed between the first display and the module assembly and configured to cover at least a portion of the module assembly by moving with respect to the first display; at least one DDI configured to operate the first display and/or the second display; a driver configured to move the second display with respect to the transparent area; and a processor electrically connected with the at least one DDI and configured to control an operation of the first display and/or the second display, in which the second display may have a first area in which an image is output and a second area defined around and outside an edge of the first area, and the processor may be configured to move the second display using the driver, based on an operation of the electronic device.

A method of operating an electronic device that includes a first display having a transparent area, a module assembly disposed under the transparent area, a second display disposed between the transparent area and the module assembly and having a first area, in which an image is output, and a driver configured to move the second display, in accordance with an embodiment, may include: recognizing an operation state of the electronic device; and moving the second display with respect to the transparent area, based on the recognition result of the operation state of the electronic device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The instant disclosure provides an electronic device that includes a front camera and an LED and can achieve full display using a sub display that is operated in the mobile device in accordance with certain disclosed embodiments, and a method of controlling the electronic device.

The electronic device according to certain embodiments can implement a full display while maintaining the front camera and the LED on the front of the mobile device.

According to the electronic device of certain embodiments, it is possible to minimize damage to the electronic device or foreign substances entering the electronic device that may occur while using the front camera and the LED.

Figure 1:
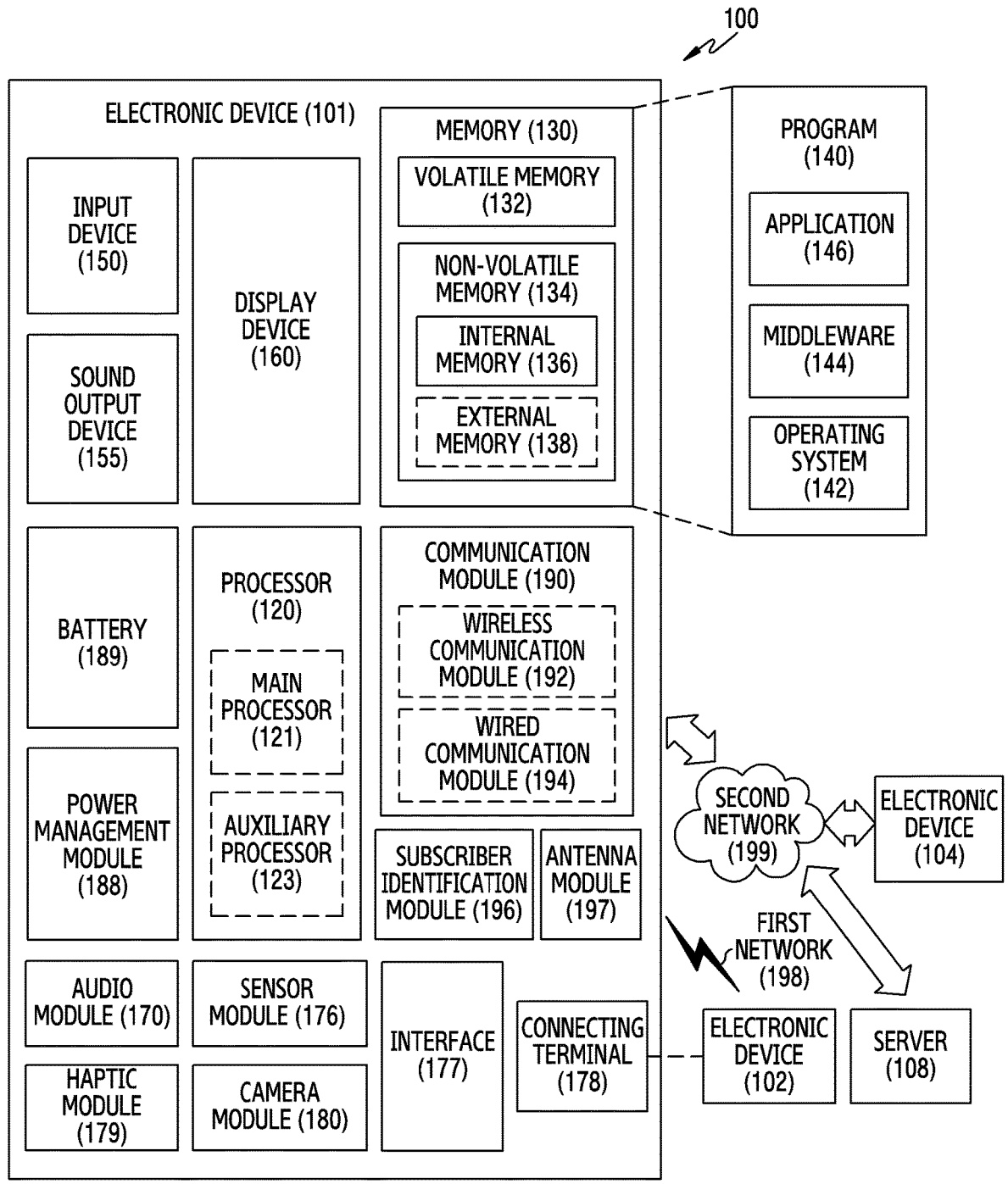
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that the various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
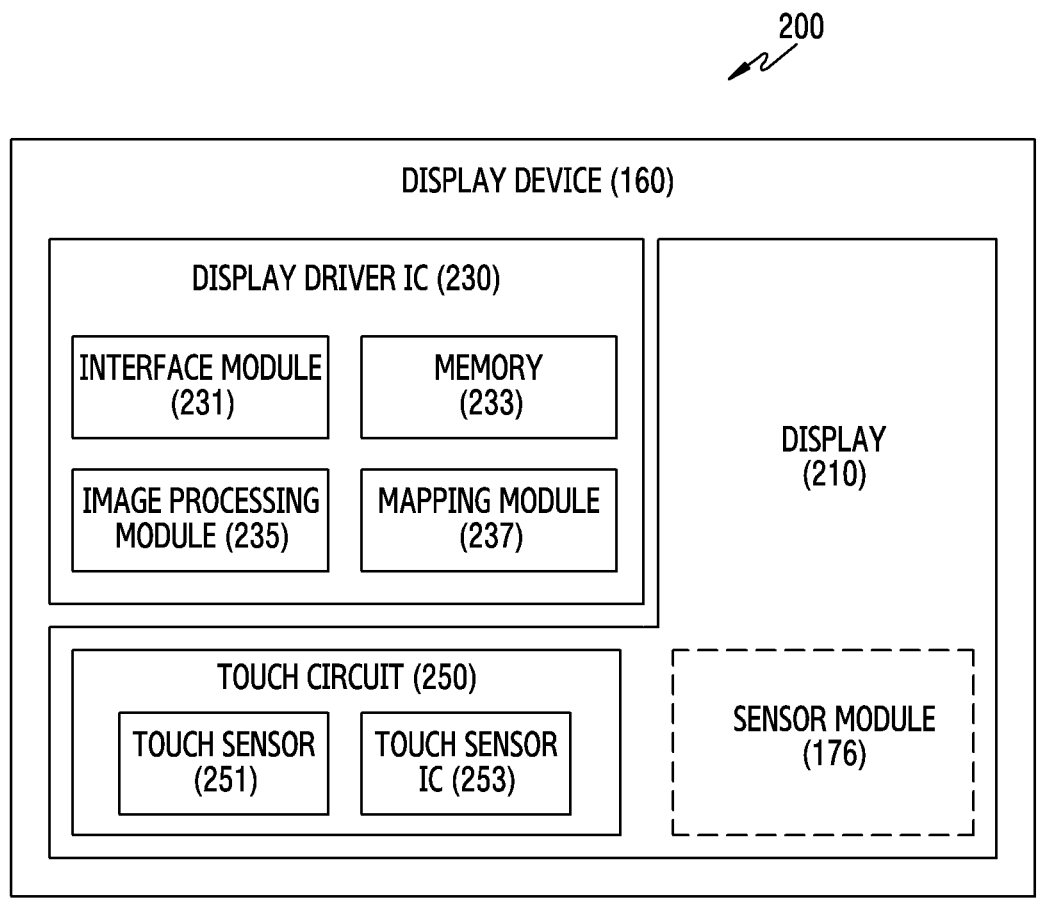
FIG. 2 is a block diagram illustrating the display device according to an embodiment.

FIG. 2 is a block diagram 200 illustrating the display device 160 according to an embodiment.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
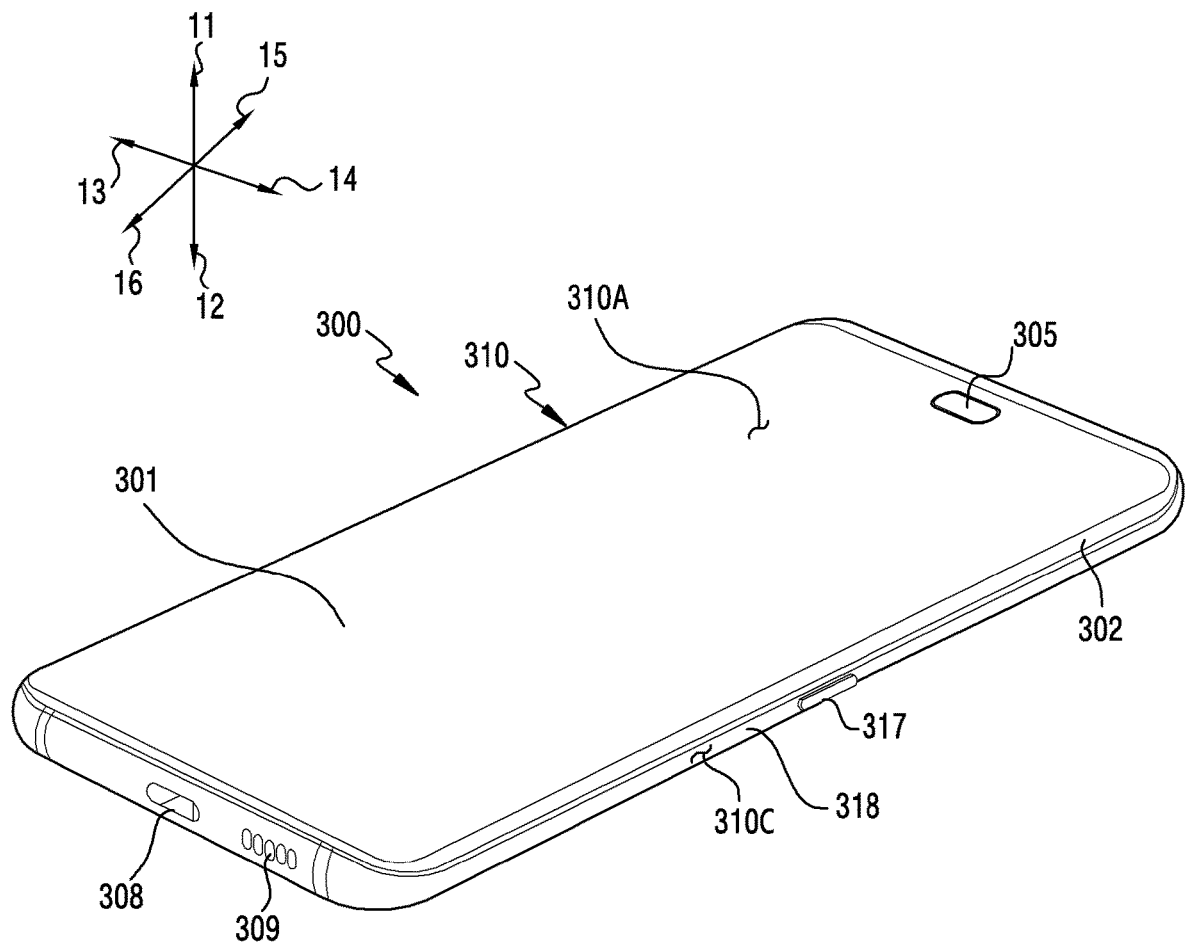
FIG. 3A is a perspective view illustrating a front side of an example mobile electronic device according to an embodiment of the present disclosure.
Figure 3B:
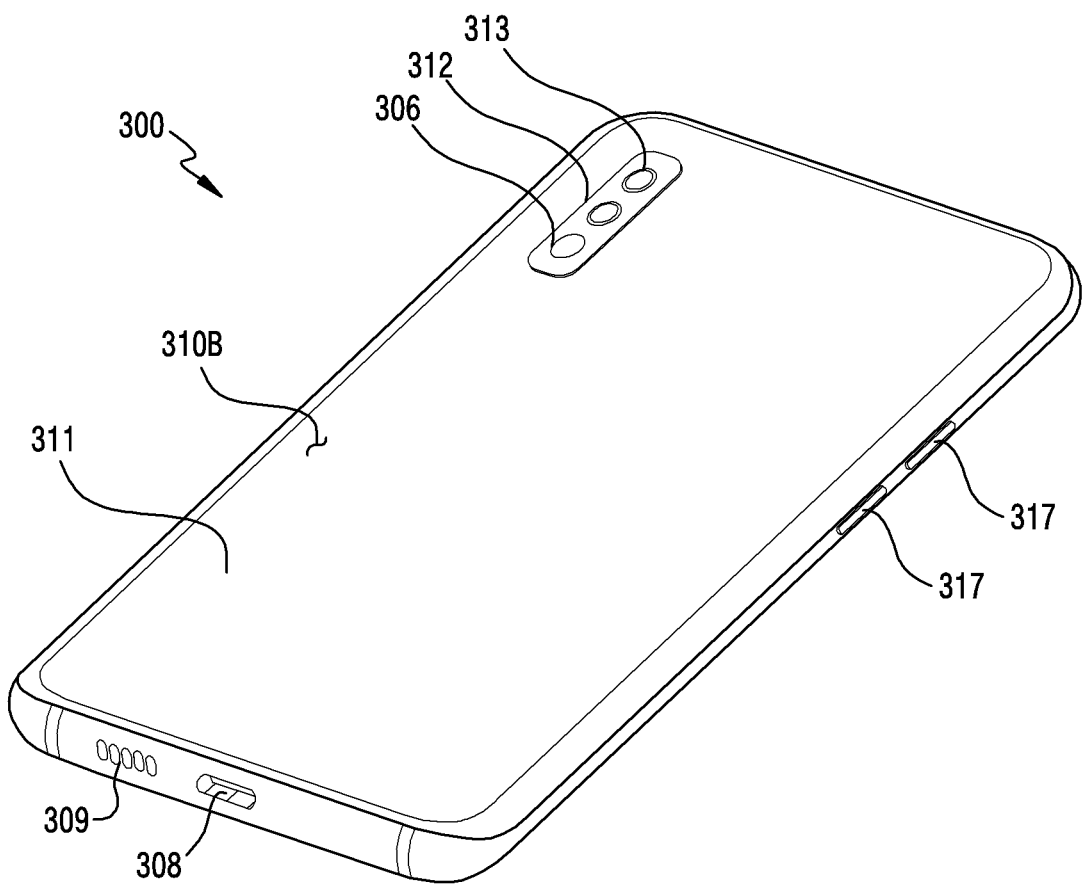
FIG. 3B is a perspective view illustrating a back side of an example electronic device of FIG. 3A according to an embodiment of the present disclosure.

FIG. 3A is a front perspective view illustrating an example mobile electronic device 300 according to an embodiment. FIG. 3B is a rear perspective view illustrating the example mobile electronic device 300 of FIG. 3A.

Referring to FIG. 3A and FIG. 3B, the electronic device 300 according to an embodiment may include a housing 310 including a first side (or a front side) 310A facing a first direction 11, a second side (or a rear side) 310B facing a second direction 12, and a lateral side (surface) 310C surrounding the space between the first side 300A and the second side 310B. In another embodiment (not shown), the housing may refer to a structure which includes only parts of the first side 310A, second side 310B, and third side 310C of FIG. 3A and FIG. 3B.

According to an embodiment, the first side 310A may be constructed of a front plate 302 (or a front cover) (e.g., a polymer plate or a glass plate having various coating layers) which is at least partially transparent. According to embodiments, the front plate 302 may have a curved portion bending and seamlessly extending from a first surface 310A to a rear plate 311 at least at a side edge portion.

According to an embodiment, the second face 310B may be formed of a substantially opaque rear plate 311. The rear plate 311 may be made of, for example, and without limitation, coated or colored glass, ceramic, polymer, metal (e.g., aluminum, stainless steel (STS), or magnesium), or a combination of two or more of these materials. According to an embodiment, the rear plate 311 may have a curved portion bending and seamlessly extending from the second face 310B to the front plate 302 at least at a side edge portion.

According to an embodiment, the side 310C is combined with a front plate 302 and a rear plate 311 and may be formed by a lateral bezel structure 318 (or a "lateral member or a side wall") including metal and/or polymer. In an embodiment, the rear plate 311 and the lateral bezel structure 318 may be integrated and may be made of the same material (e.g., metallic material such as aluminum).

According to an embodiment, the electronic device 300 may include, for example, and without limitation, at least one or more of a display 301, audio modules, sensor modules, camera modules and key input devices 317, and connector holes 308 and 309. In certain embodiments, the electronic device 300 may omit at least one (e.g., the key input devices 317) of these components or may additionally include other components.

For example, an electronic device 300 may include a sensor module not shown. For example, sensors such as proximity sensor or illumination sensor may be integrated with the display 301 or may be disposed adjacent to the display 301 in a region of the front plate 302.

In an embodiment, the electronic device 300 may further include a light emitting element and the light emitting element may be disposed adjacent to the display 301 in the region of the front plate 302. The light emitting element, for example, may provide state information of the electronic device 300 outputted as light. In another embodiment, the light emitting element, for example, may provide a light source that operates with the operation of a camera module. The light emitting element, for example, may be an LED, an IR LED, or a xenon lamp.

The display 301 may be exposed through, for example, a large portion of the front plate 302. In some embodiments, the edges of the display 301 may be formed to be substantially the same as the contour shape of the front plate 302 adjacent thereto. In another embodiment (not shown), the distance between the boundary of the display 301 and the boundary of the front plate 302 may be substantially constant in order to maximize the exposed area of the display 301.

In another embodiment, a recess or an opening may be formed in a portion of a display region of the display 301, and other electronic devices aligned with the recess or the opening such as a camera module, a proximity sensor, and/or an illumination sensor (not shown) may be included.

In another embodiment, the electronic device 300 further comprises sub display 305 corresponding to the shape of the recess or opening formed in the display 301. The sub display 305 may be exposed through the area of the recess or opening.

In another embodiment (not shown), at least one of the camera module 312 and 313, the fingerprint sensor and the light-emitting element 306 may be included in the rear face of the screen display area of the display 301. In another embodiment (not shown), the display 301 may be coupled to or disposed adjacent to a touch-sensing circuit, a pressure sensor that is capable of measuring the intensity of the touch (pressure), and/or a digitizer that detects a magnetic-field-type stylus pen.

The audio modules may include a microphone hole and speaker holes 309. The microphone hole may include a microphone disposed therein so as to acquire external sound, and in some embodiments, multiple microphones may be disposed therein so as to detect the direction of sound. In some embodiments, the speaker holes 309 and the microphone hole may be implemented as a single hole, or a speaker may be included therein without the speaker holes (e.g., a piezo speaker).

The electronic device 300 may include a sensor modules (not shown) to generate electrical signals or data values corresponding to the internal operating state or the external environmental state of the electronic device 300. The sensor modules may include, for example, a proximity sensor disposed on the first face 310A of the housing, a fingerprint sensor integrated or adjacent to the display 301, and/or HRM sensor disposed on the second face 310B of the housing 310. The electronic device 300 may further include at least one of sensors (not shown) such as, for example, and without limitation, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, an illuminance sensor, or the like.

The camera modules may include a first camera device disposed in the recess corresponding to the sub-display 305 disposed on the first face 310A of the electronic device 300 and a second camera device 312 and 313 disposed on the second face 210B, and/or a flash 306. According to another embodiment, the first camera device may be disposed below the sub display 305 and be visible outside the electronic device 300 or covered by the sub display 305 depending on the position of the sub display 305. The camera devices may include one or more lenses, image sensor, and/or image signal processor. The flash 306 may be, for example, a light-emitting diode or a xenon lamp. In some embodiments, two or more lenses (e.g., infrared camera lens, wide-angle lens, and telephoto lens) and image sensors may be disposed on one face of the electronic device 300.

The key input devices 317 may be disposed on the side faces 310C of the housing 310. In another embodiment, the electronic device 300 may not include some or all of the above-mentioned key input devices 317, and the key input device 317 may instead be implemented in another form, such as soft keys or the like on the display 301. In some embodiments, the key input devices may include a sensor module disposed on the second face 310B of the housing 310.

The connector holes 308 may include the first connector hole 308 capable of accommodating a connector (e.g., a USB connector) for transmitting/receiving power and/or data of an external electronic device and/or the second connector hole or earphone jack capable of accommodating a connector for transmitting/receiving an audio signal with respect to the external electronic device. In embodiments, the first connector hole and the second connector hole may be implemented as one hole, and in some embodiments, the electronic device 300 transmits and receives power, audio signal and/or data to and from an external electronic device without a connector hole.

Figure 4:
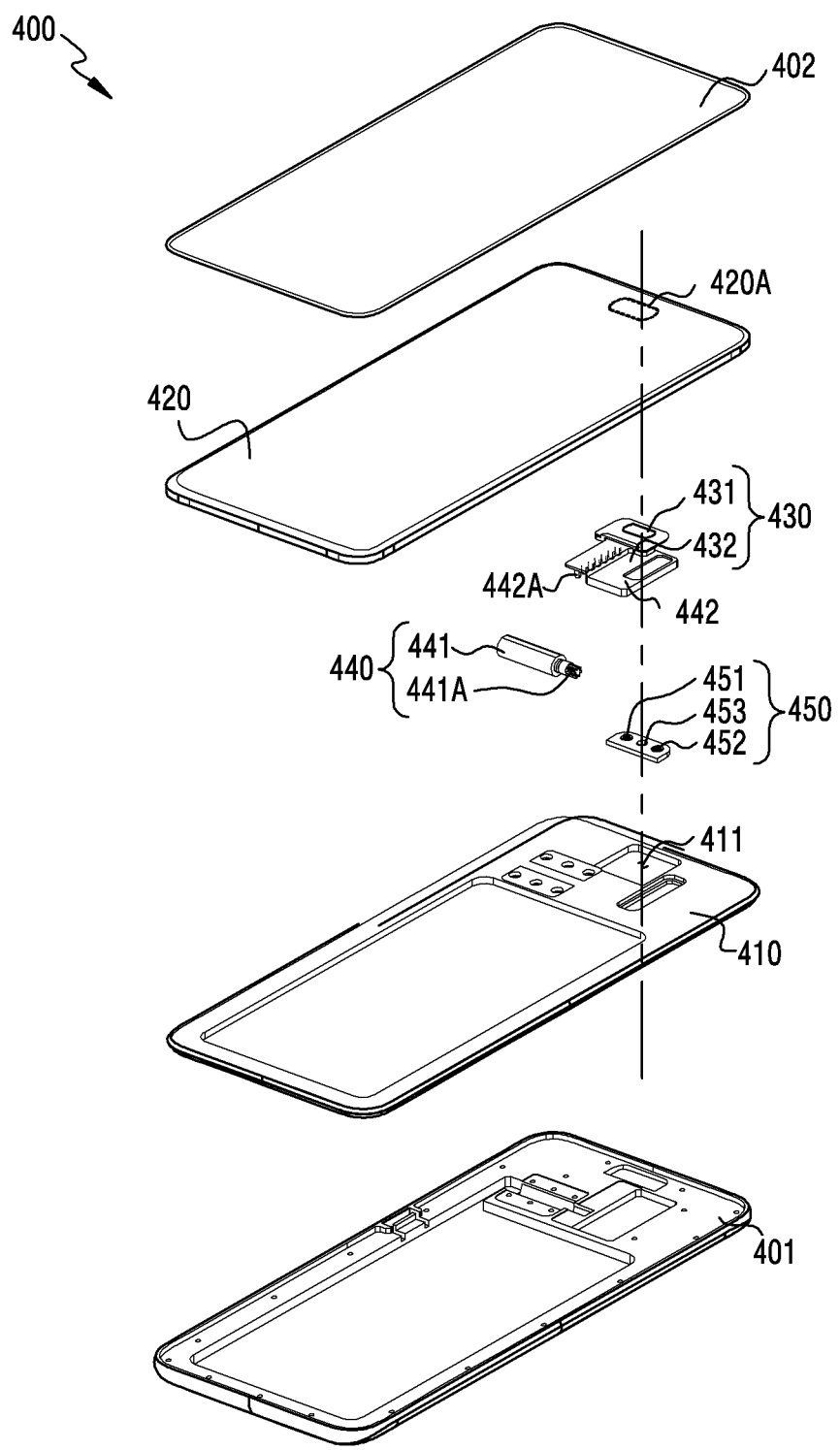
FIG. 4 is an exploded perspective view of an electronic device according to an embodiment.

FIG. 4 is an exploded perspective view of an electronic device 400 according to an embodiment.

Referring to FIG. 4, the electronic device 400 may include a housing 401 (e.g., the housing 310 in FIG. 3A), a transparent plate 402 (e.g., the front plate 302 in FIG. 3A), a supporting member 410, a first display 420 (e.g., the display 301 in FIG. 3A), a second display 430 (e.g., the sub display 305 in FIG. 3A), a driver 440, and a module assembly 450. At least one of the components of the electronic device 400 may be the same as or similar to at least one of the electronic device 300 shown in FIG. 3A or FIG. 3B, and repeated description is omitted below.

According to an embodiment, the housing 401 of the electronic device 400 may have a first surface (e.g., the front surface 310A in FIG. 2A), a second surface (e.g., the rear surface 310B in FIG. 2B), and a side (e.g., the side 310C in FIG. 2B) extending along the edges of the first surface and the second surface and surrounding the internal space of the electronic device 400.

According to an embodiment, the transparent plate 402 may form the first surface of the electronic device 400. The edge of the transparent plate 402 may be connected to the side (or the side wall) of the housing 401 in contact with at least a portion of the side. The transparent plate 402 may be made of a transparent polymer material, such as polycarbonate (PC), polymethyl methacrylate (PMMA), polyimide (PE), polyethylene terephthalate (PET), and polypropylene terephthalate (PPT), or glass material. The transparent polymer or glass material are only examples of the materials that can be used for manufacturing the transparent plate 402 and the material of the transparent plate 402 is not so limited.

According to an embodiment, the supporting plate 410 can support electronic parts (e.g., a printed circuit board, the driver 440, and the module assembly 450) disposed in the electronic device 400. According to an embodiment, the supporting member 410 may extend from the side of the housing 401 into the internal space of the electronic device 400. The supporting member 410 may be integrated with the side of the housing 401 or may be separated from the side of the housing 401 and disposed independently in the housing 401. According to an embodiment, the supporting member 410 may be at least partially in contact with the transparent plate 402 to support the transparent plate 402 and surround the display 430 to be described below. According to an embodiment, an opening 411 may be formed at the supporting member 410, and the driver 440 and the module assembly 450 may be disposed in the opening 411 of the supporting member 410 to be supported by the supporting member 410.

According to an embodiment, the first display 420 may be composed of a plurality of layers and disposed between the transparent plate 402 and the supporting member 410. For example, the first display 420 may include a base substrate, a thin film transistor (TFT) layer, an electrode layer, an organism layer, or a pixel layer. Depending on embodiments, the first display 420 may further include certain other appropriate components such as a thin enveloping layer that envelopes the pixel layer and a back film for supporting the base substrate. According to an embodiment, the first display 420 may be at least partially exposed to the outside of the electronic device 400 through the transparent plate 402. The first display 420 can emit light from pixels to transmit information to the user and the emitted light can be transmitted to the outside through the transparent plate 402. According to an embodiment, a transparent area 420A may be defined in the first display 420. Some areas of electronic parts (e.g., the second display 430 and the module assembly 450) disposed at the rear of the first display 420 may be exposed to the outside of the electronic device 400 through the transparent area 420A.

According to an embodiment, the first display 420 may include a display panel (not shown) or a touch panel (not shown) and the touch panel may be disposed on the cells of the display panel. According to an embodiment, the first display 420 may be combined with or disposed adjacent to some of a touch sensing circuit of the touch panel to sense a touch. In addition, the first display 420 may further include a pressure sensor that can measure the intensity (pressure) of a touch, or a digitizer that detects a magnetic stylus pen.

According to an embodiment, the second display 430 may be disposed between the first display 420 and the supporting member 410. The second display 430 can be moved in an up-down or left-right direction with respect to the first display 420 by the driver 440. Accordingly, at least a partial area of the second display 430 can be exposed to the outside of the electronic device 400 through the transparent area 420A of the first display 420. In another example, the second display 430 may be positioned outside the transparent area 420A of the first display 420, so the second display 430 is be obscured by the first display 420. According to an embodiment, the second display 430 may have a visible area 431 and a non-visible area 432 defined outside and around the edge of the visible area 431. Pixels are disposed in the visible area 431, so it is possible to transmit visual information to the user from the visible area 431 using light that is emitted from the pixels. A circuit board (FPCB) for displaying information in the visible area 431 may be disposed in the non-visible area 432. According to an embodiment, the visible area 431 may have a shape corresponding to the transparent area 420A (e.g., a shape in which the edge of the transparent area 420A is outside the edge of the visible area 431 and is offset by a certain distance). However, the visible area 431 is not limited to shape described in the embodiment, and in other embodiments, the edge of the visible area 431 may be outside the edge of the transparent area 420A.

According to an embodiment, the driver 440 may be positioned in an area adjacent to the second display 430 and can move the second display 430 into various positions. According to an embodiment, the driver 440 may include a motor 441 and a mover 442 that is moved by the motor 441. The second display 430 may be coupled and fixed to a side of the mover 442, so the driver 440 can move the second display 430 using power generated by the motor 441. A pinion gear 441A is fitted on the rotary shaft of the motor 441 and a rack 442B corresponding to the pinion gear 441A of the motor 441 is disposed on the mover 442, so the driver 440 can move the second display 430 in a straight line using rotation of the motor 441. According to an embodiment, the driver 440 can move the second display 430 straight in an up-down direction and straight in a left-right direction with respect to the first display 420. According to another embodiment (not shown), the driver 440 includes a linear actuator, thereby being able to move the second display 430 in an up-down or left-right direction with respect to the first display 420 by operating the linear actuator. In still another embodiment, the driver 440 may diagonally move the second display 430.

According to an embodiment, the module assembly 450 may be disposed under the transparent area 420A of the first display 420 and the second display 430. When the second display 430 is positioned under the transparent area 420A, the module assembly 450 is not seen from the outside of the electronic device 400, but when the second display 430 is moved out of the transparent area 420A, the module assembly 450 can be exposed to the outside of the electronic device 400 through the transparent area 420A. In an embodiment, the module assembly 450 may include a first camera module 451, a second camera module 452, and an LED module 453. According to an embodiment, the first camera module 451 can obtain biometric information of the user by recognizing an iris of the user and the second camera module 452 can produce images by taking pictures of objects, people, etc. facing the transparent plate 402. The LED module 453 can provide a light source in cooperation with the first camera module 451 and/or the second camera module 452 or can provide information about the operation states of the electronic device 400 outputted as light. In an embodiment, at least one of the components (the first camera module 451, the second camera module 452, and the LED module 453) of the module assembly 450 may be omitted or other one or more components (e.g., proximity sensor and illumination sensor) may be added.

Figure 5:
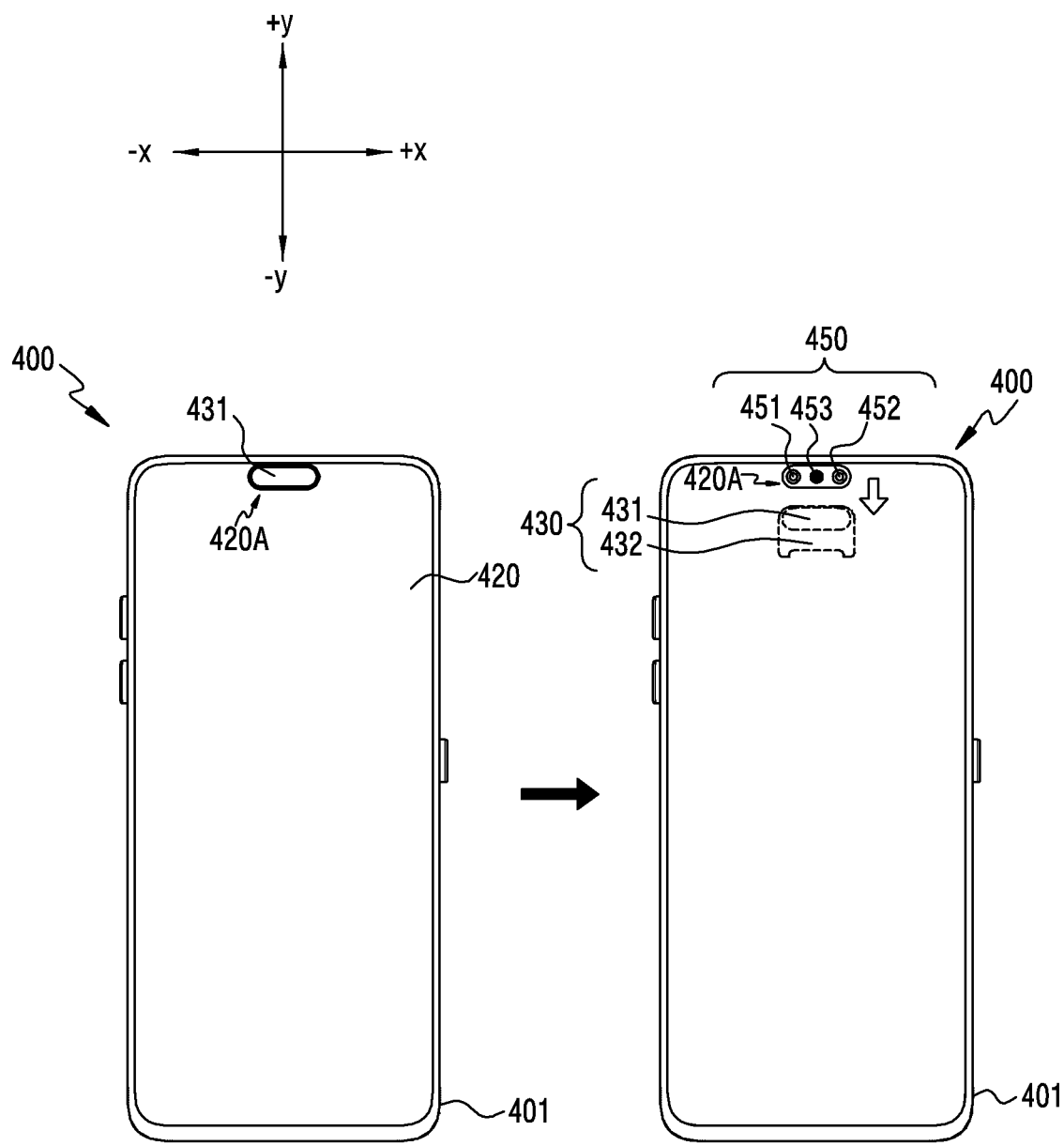
FIG. 5 is a front view showing a process in which a second display of an electronic device according to an embodiment is moved.
Figure 6:
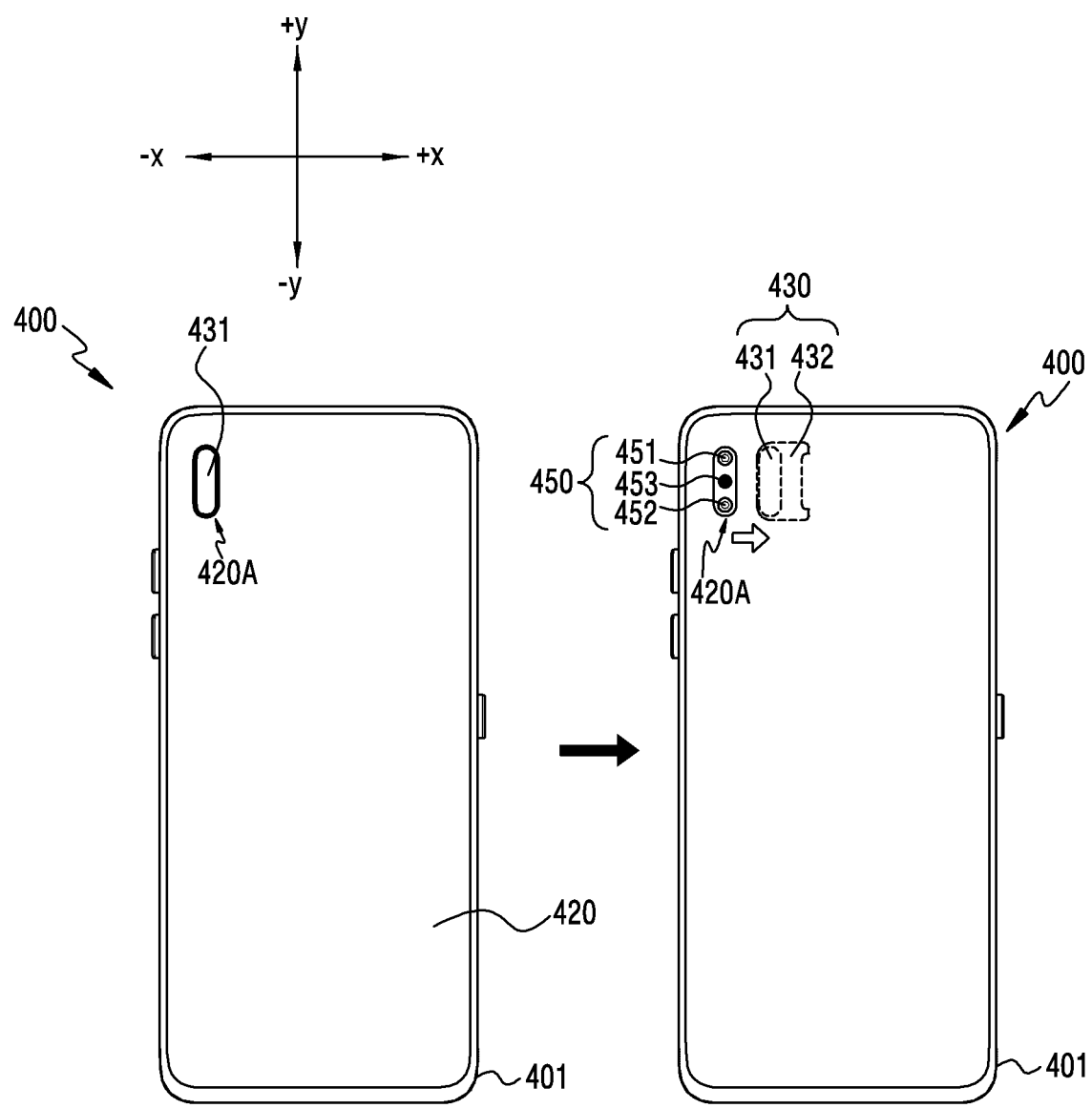
FIG. 6 is a front view showing a process in which a second display of an electronic device according to another embodiment is moved.

FIG. 5 is a front view showing a process in which the second display 430 of the electronic device 400 according to an embodiment is moved. FIG. 6 is a front view showing a process in which a second display 430 of an electronic device 400 according to another embodiment is moved.

Referring to FIGS. 5 and 6, an electronic device 400 according to the two embodiments may include a first display 420, a second display 430 disposed under the first display 420, and a module assembly 450 disposed under the second display 430. At least one of the components of the electronic device 400 may be the same as or similar to at least one of the electronic device 400 shown in FIG. 4, and repeated description is omitted below.

Referring to FIG. 5, a transparent area 420A may be defined at the center of the upper end portion of the first display 420 in the electronic device 400 according to an embodiment. A visible area 431 of the second display 430 is positioned under the transparent area 420A, so the visible area 431 can be exposed to the outside of the electronic device 400 through the transparent area 420A. According to an embodiment, a driver (e.g., the driver 440 of FIG. 4) is disposed under the second display 430 (e.g., in the −y direction in FIG. 5), so it can move the second display 430 in the up-down direction (e.g., in the +y or −y direction in FIG. 5). When a designated event (e.g., execution of a camera application) occurs in the electronic device 400, the driver can move down the second display 430 such that the visible area 431 of the second display 430 positioned under the transparent area 420A moves out of the transparent area 420A. When the visible area 431 of the second display 430 is moved out of the transparent area 420A, the module assembly 450 can be exposed to the outside of the electronic device 400 through the transparent area 420A. Accordingly, the iris of the user may be recognized by the first camera module 451 or the user can make a video call through the second camera module 452.

Referring to FIG. 6, a transparent area 420A may be defined at the left upper portion of the first display 420 in an electronic device 400 according to another embodiment. According to an embodiment, a driver (e.g., the driver 440 shown in FIG. 4) is disposed at the right of the second display 430 (e.g., in the +x direction in FIG. 6), so it can move the second display 430 in the left-right direction (e.g., in the +x or −x direction in FIG. 6). When a designated event (e.g., video call) occurs in the electronic device 400, the driver can move the second display 430 to the right such that the visible area 431 of the second display 430 positioned under the transparent area 420A moves out of the transparent area 420A.

Though not shown in the figures, in an electronic device 400 according to an embodiment, a transparent area (e.g., the transparent area 420A shown in FIG. 6) may be defined at the upper end portion of a first display (e.g., the first display 420 shown in FIG. 6), and a driver (e.g., the driver 440 shown in FIG. 4) may move a second display (e.g., the second display 430 shown in FIG. 6) to the left in response to the operation state of an electronic device (e.g., the electronic device 400 shown in FIG. 6). The position of the transparent area (e.g., the transparent area 420A shown in FIG. 5 or FIG. 6) and the movement direction of the second display (e.g., the second display 430 shown in FIG. 5 or FIG. 6) are not limited to those described in the above embodiments. According to another embodiment (not shown), even though a transparent area is defined at the center of the upper end portion of a first display, a second display can be moved left or right.

Figure 7A:
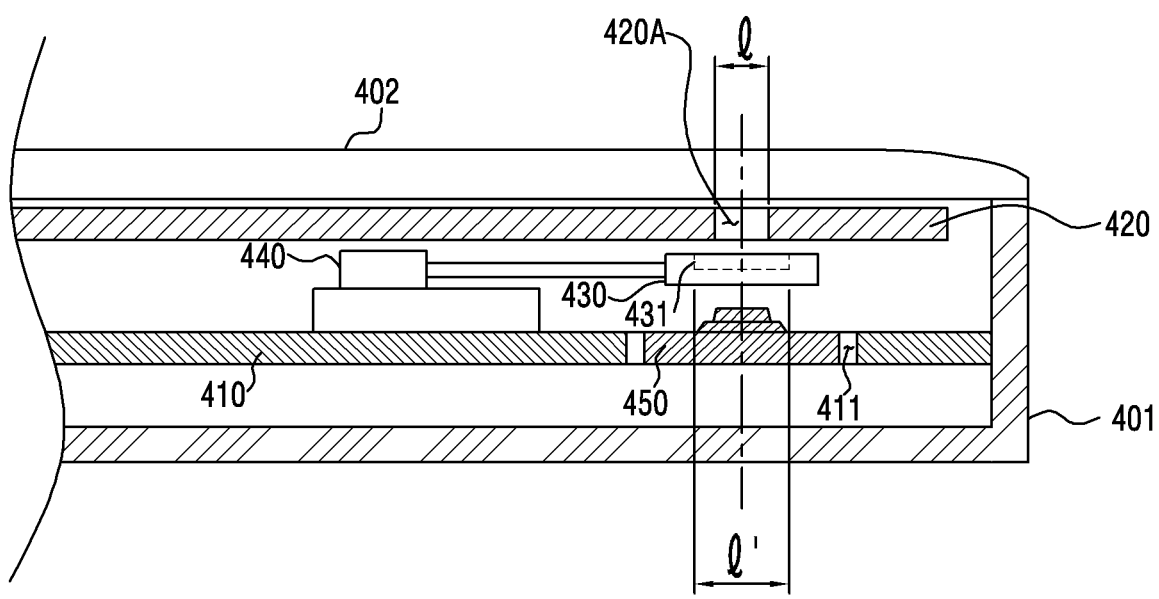
FIG. 7A is a cross-sectional view showing the position of a second display when full display of an electronic device according to an embodiment is implemented.
Figure 7B:
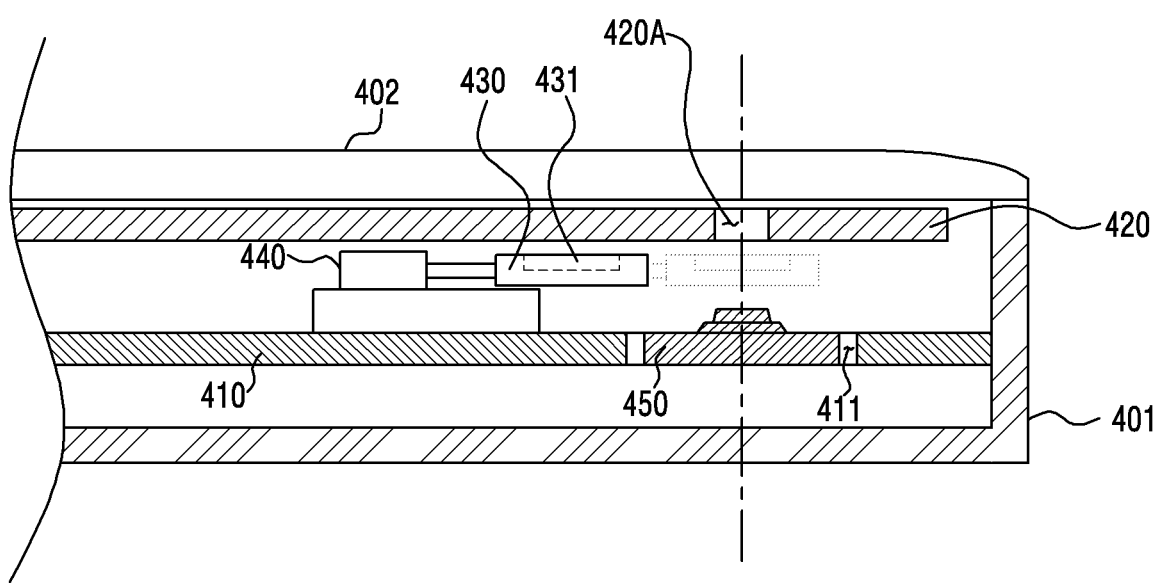
FIG. 7B is a cross-sectional view showing the position of a second display when a designated event occurs in an electronic device according to an embodiment.

FIG. 7A is a cross-sectional view showing the position of a second display 430 when full display of an electronic device 400 according to an embodiment is implemented. FIG. 7B is a cross-sectional view showing the position of the second display 430 when a designated event occurs in the electronic device 400 according to an embodiment.

Referring to FIGS. 7A and 7B, an electronic device 400 according to an embodiment may include a housing 401, a front plate 402, a first display 420, a second display 430, a supporting member 410, a driver 440, and a module assembly 450.

According to an embodiment, the first display 420 is disposed under the front plate 402 and can be exposed to the outside of the electronic device 400. According to an embodiment, a transparent area 420A is defined in at least a partial area of the first display 420, so components (e.g., the second display 430 and the module assembly 450) disposed under the first display 420 can be exposed to the outside of the electronic device 400 through the transparent area 420A. For example, the transparent area 420A may be an area in the first display 420 in which pixels are not disposed. Alternatively, the transparent area 420A may be a hole formed through the display area of the first display 420. Though not shown in the figures, a touch panel (not shown) may be disposed between the front plate and the first display 420, so the electronic device 400 can sense touches on the transparent area 420A by the user.

According to an embodiment, the second display 430 is disposed under the first display 420 and may have a visible area 431 in which pixels are disposed to be able to emit light. According to an embodiment, the visible area 431 may have a shape corresponding to the transparent area 420A, and, according to another embodiment, the visible area 431 may have a shape in which the edge of the visible area 431 are outside the edge of the transparent area 420A, so the cross-sectional length 'l'' of the visible area 431 is greater than the cross-sectional length 'l' of the transparent area 420A. According to an embodiment, the second display 430 is connected to the driver 440, so it can be moved in an up-down or left-right direction between the first display 420 and the module assembly 450 by the driver 440.

According to an embodiment, the module assembly 450 is positioned in an opening 411 of the supporting member 410 and the opening 411 is positioned under the transparent area 420A, so the module assembly 450 can be disposed in the area under the transparent area 420A. The module 450, depending on the position of the second display 430, may be seen from the outside of the electronic device 400 through the transparent area 420A or may not be seen from the outside of the electronic device 400 when it is covered by the second display 430.

Referring to FIG. 7A, the visible area 431 according to an embodiment may be positioned under the transparent area 420A by movement of the second display 430, so, in this case, the transparent area 420A may appear to be filled with the visible area 431 when seen from above the front plate 402. When the visible area 431 of the second display 430 is positioned under the transparent area 420A, the electronic device 400 can implement a full display by operating both of the first display 420 and the second display 430. That is, when full display is required (e.g., playback of media), the electronic device 400 moves the second display 430 such that the visible area 431 is positioned under the transparent area 420A, thereby being able to implement a full display, i.e., the first display 420 and the second display 430 are operated together to display the full image.

Referring to FIG. 7B, according to another embodiment, the visible area 431 of the second display 430 may be positioned below and out of the transparent area 420A by the driver 440, so, in this case, the module assembly 450 can be exposed to the outside of the electronic device 400 through the transparent area 420A. That is, when it is required to operate the module assembly 450 (e.g., using the front camera in a video call), the electronic device 400 moves the second display 430 such that the visible area 431 moves out of the transparent area 420A to be below the transparent area 420A, thereby being able to show the module assembly 450 to the outside of the electronic device 400. Although FIGS. 7A and 7B show only the embodiment in which the driver 440 includes a linear actuator and moves the second display 430 by operating the linear actuator, the disclosure is not limited to this embodiment. According to another embodiment, the driver 440, similar to the driver shown in FIG. 4 (e.g., the driver 440 shown in FIG. 4), may include a motor (e.g., the motor 441 shown in FIG. 4) and a mover (e.g., the mover 442 shown in FIG. 4) and may move the second display 430 by operating the rotary shaft of the motor.

Figure 8:
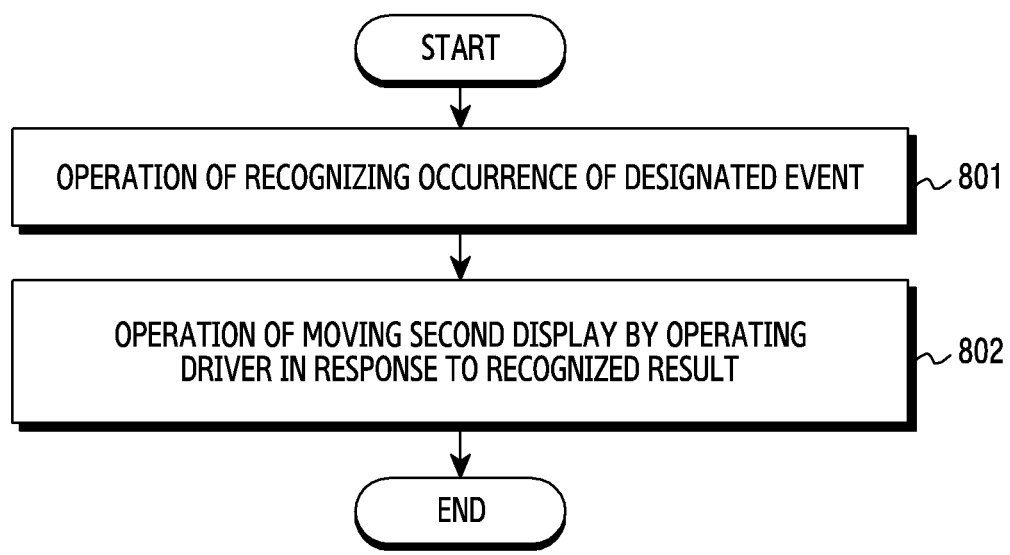
FIG. 8 is a flowchart showing a process of moving a second display, depending on whether an event occurs, in an electronic device according to an embodiment.
Figure 9:
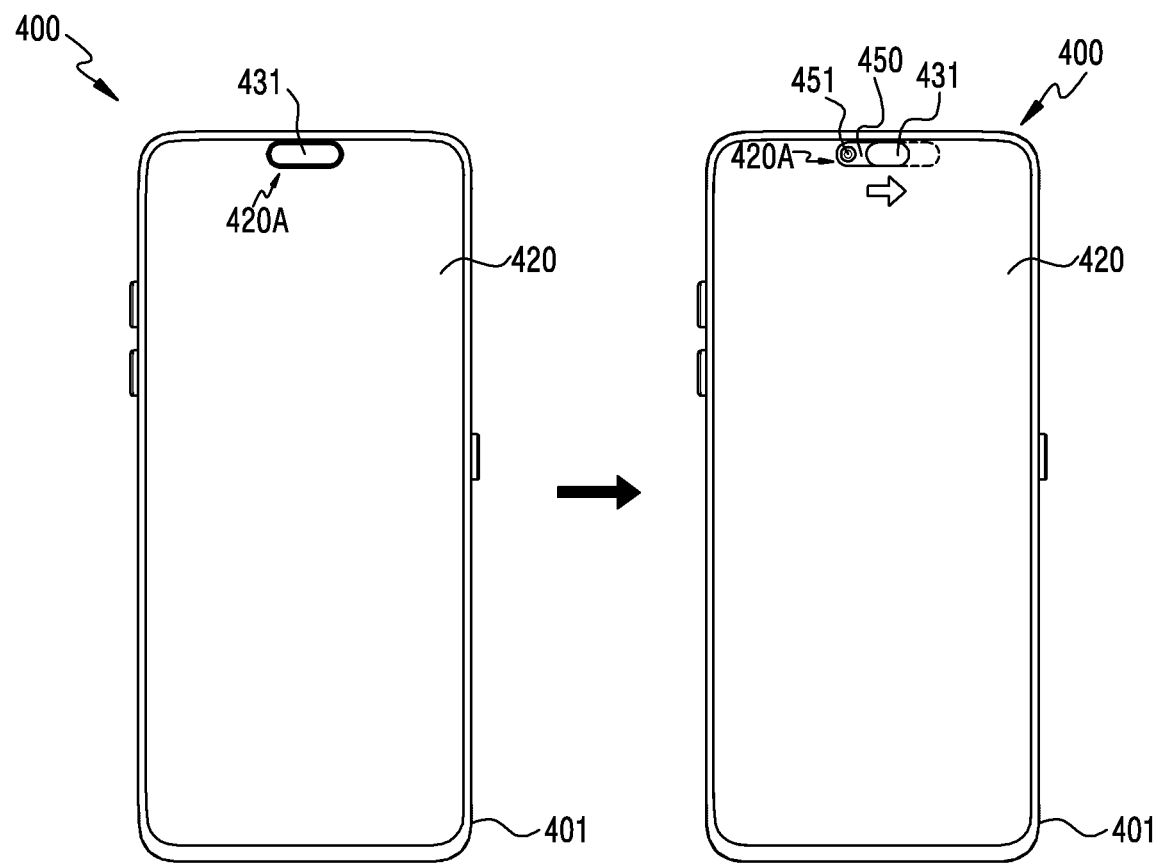
FIG. 9 is a front view showing the state in which only a portion of a module assembly is shown to the outside due to movement of a second display in an electronic device according to an embodiment.

FIG. 8 is a flowchart showing a process of moving the second display, depending on whether an event occurs, in the electronic device according to an embodiment. FIG. 9 is a front view showing the state in which only a portion of a module assembly is shown to the outside due to movement of the second display in the electronic device according to an embodiment.

Referring to FIGS. 8 and 9, the electronic device 400 according to an embodiment may further include a processor (e.g., the processor 120 shown in FIG. 1). The processor controls the operation of a driver (e.g., the driver 440 shown in FIG. 4) in response to the operation state of the electronic device, thereby being able to move the position of a second display (e.g., the second display 430 shown in FIG. 4) connected to the driver. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

Referring to FIG. 8, in operation 801, the processor of the electronic device can recognize whether a designated event has occurred, based on the operation state of the electronic device. For example, the processor can recognize the operation state of the electronic device such as whether the user is initiating a video call and whether the camera module is to be used, and can determine whether a designated event has occurred in the electronic device, based on the recognition result.

According to an embodiment, the designated event that is recognized in operation 801 may be one in which operation of the components (e.g., the camera module and the LED module) of the module assembly is required. For example, the processor can determine that the occurred designated event is the user making a video call, the user taking a picture using the front camera, or when iris recognition for obtaining biometric information is required.

When it is recognized that such a designated event has occurred in operation 801, the processor of the electronic device according to an embodiment, in operation 802, can make the entire module assembly available to the outside of the electronic device by moving the second display using the driver. That is, the processor according to an embodiment, in operation 802, can expose the module assembly to the outside of the electronic device through the transparent area by moving the second display such that the visible area moves out of the transparent area.

According to another embodiment, even if the user makes a voice call, the processor can expose the entire module assembly to the outside of the electronic device by recognizing that a designated event has occurred and moving the second display in response to the recognized result. However, the cases when the user makes a video call, takes a picture using the front camera, uses the iris recognition function, or makes a voice call are only examples of the designated event, and the designated event is not so limited.

According to an embodiment, the electronic device can generate sound by vibrating the first display, and the transparent area of the first display may be the portion of the first display that the user's ear comes in contact with during a voice call. Thus, when the second display is positioned under the transparent area, loss of vibration may be generated by the second display while the first display is vibrated. To prevent this, the user making a voice call may be a recognized as a designated event described above. That is, when user is making a voice call, the processor of the electronic device according to an embodiment may move the second display out of the transparent area of the first display, in order to improve voice call quality.

Referring to FIG. 9, according to another embodiment, the designated event that is recognized in operation 801 may be when only some of the components (e.g., the camera module and the LED module) of the module assembly is required.

For example, when the user uses iris recognition, only the first camera module 451 for iris recognition has to be operated, so the processor can determine that the designated event for iris recognition has occurred. In another example, when the user uses only the function of the front camera of the electronic device, for example, for making a video call and taking a picture through the front camera, only the second camera module and the LED module for performing the function of the front camera have to be operated, so the processor can determine that a designated event for front camera operation has occurred. These are only examples are additional designated events may be defined.

When it is recognized that such a designated event has occurred in operation 801, the processor of the electronic device 400 according to an embodiment, in operation 802, can expose only a portion of the module assembly 450 to the outside of the electronic device by moving the second display by operating the driver. According to an embodiment, the processor of the electronic device 400 can expose only a portion of the visible area 431 of the second display 430 and the first camera module 451 of the module assembly 450 through the transparent area 420A by moving the second display 430. According to another embodiment (not shown), the processor of the electronic device 400 can expose only a portion of the visible area 431 of the second display 430 and the second camera module of the module assembly 450 (e.g., the second camera module 452 shown in FIG. 5) through the transparent area 420A by moving the second display 430.

According to an embodiment, when recognizing that a designated event has been ended (e.g., uses finishes taking a picture through the front camera and iris recognition is ended), the processor of the electronic device 400 can return the position of the second display to the original position such that the visible area of the second display is positioned under the transparent area 420A of the first display 420 and the module assembly 450 is entirely obscured.

That is, the electronic device 400 according to certain embodiments can expose the entire module assembly 450 to the outside or only a portion (e.g., the first camera module 451) thereof when a designated event has occurred. Further, when it is not required to show the module assembly 450 to the outside, the processor can maintain the full display state.

Figure 10:
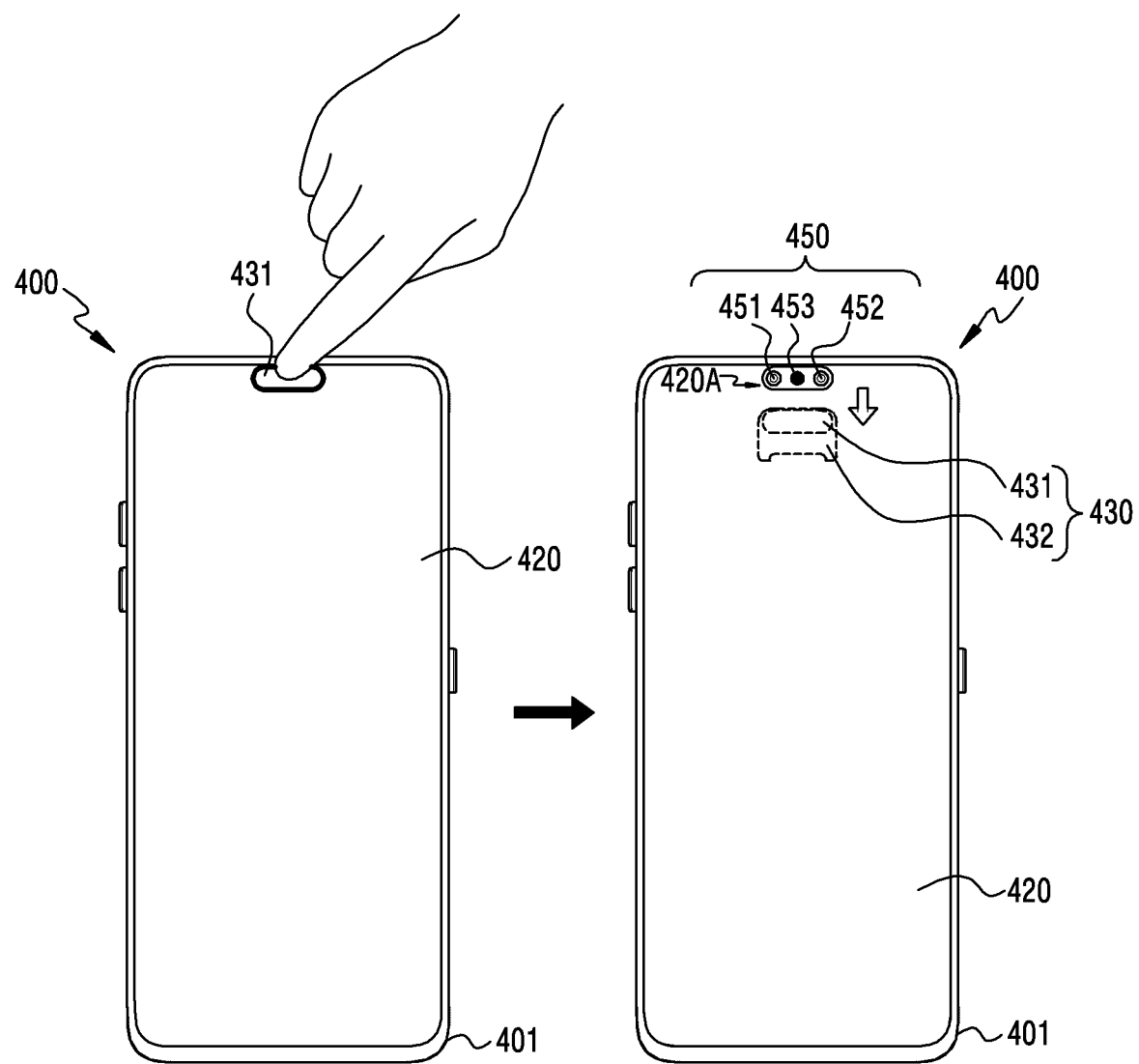
FIG. 10 is a view showing a process in which a second display moves by a touch by a user according to an embodiment.
Figure 11:
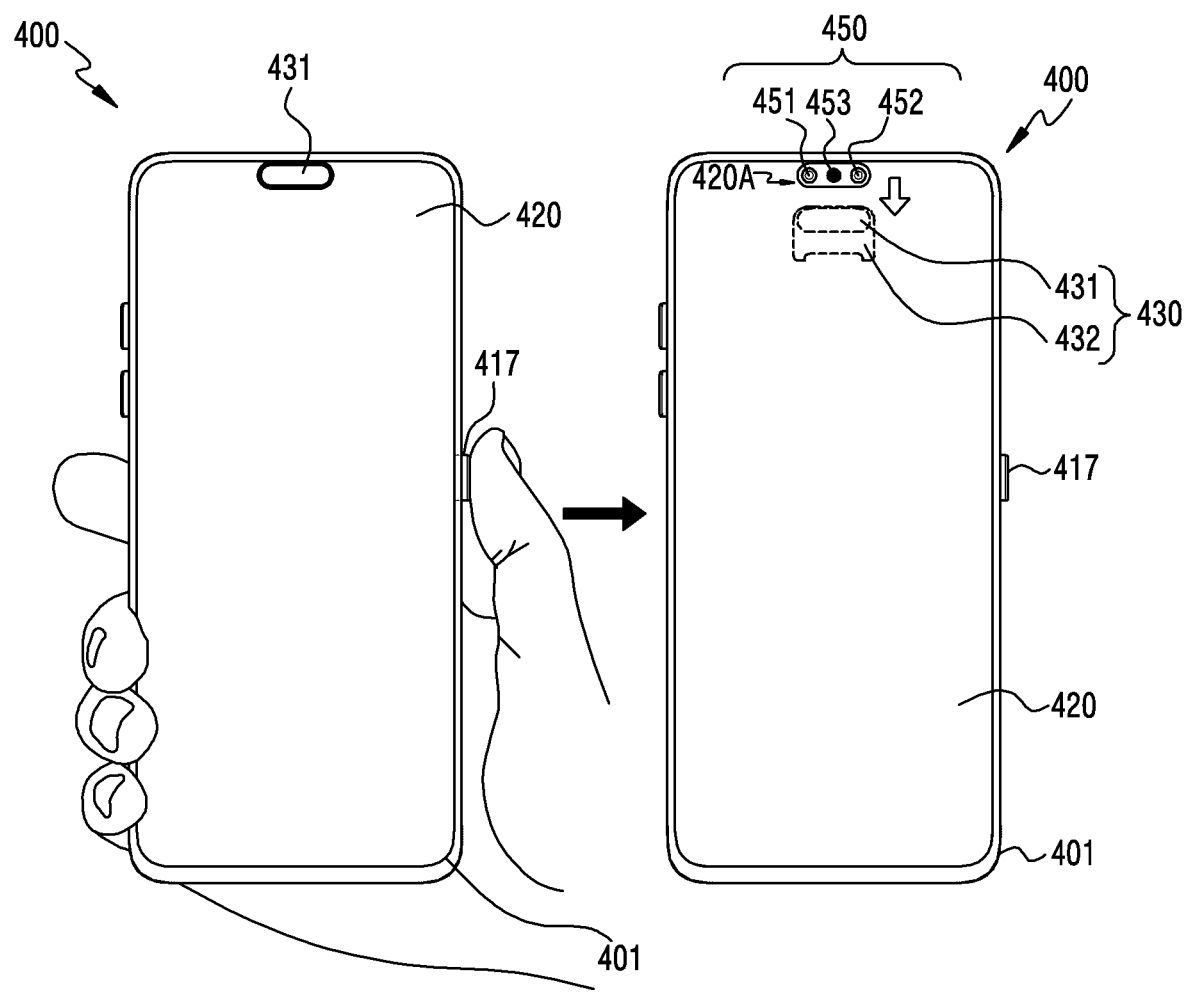
FIG. 11 is a view showing a process in which the second display moves by operation of a button by a user according to an embodiment.

FIG. 10 is a view showing a process in which the second display 430 moves by a touch by a user according to an embodiment. FIG. 11 is a view showing a process in which the second display 430 moves by operation of a button 417 by a user according to an embodiment.

According to certain embodiments, the electronic device 400 can move the second display 430, based on whether a designated event has occurred, or can move the second display 430 in response to operation by a user.

Referring to FIG. 10, the electronic device 400 according to an embodiment can move the second display 430 in response to a touch by the user. A touch panel is disposed in the transparent area 420A of the first display 420, so a processor (not shown, e.g., the processor 120 shown in FIG. 1) can recognize a touch in the transparent area 420A by the user.

According to an embodiment, when the user touches the transparent area 420A one or more times (e.g., two times) when the visible area 431 of the second display 430 is positioned to correspond to the transparent area 420A of the first display 420. When the touch input is entered, the processor can move the second display 430 such that the visible area 431 moves out of the transparent area 420A. On the other hand, when the user touches the transparent area 420A one or more times when the visible area 431 is out of the transparent area 420A, the processor can move the second display 430 such that the visible area 431 corresponds to the transparent area 420A.

According to another embodiment (not shown), when the user touches the transparent area 420A for a designated time period, the processor can move the second display 430 such that the visible area 431 corresponds to the transparent area 420A or the visible area 431 moves out of the transparent area 420A.

According to another embodiment (not shown), when the user inputs a downward drag on the transparent area 420A (e.g., from the +y direction to the −y direction in FIG. 5) when the visible area 431 positioned to correspond to the transparent area 420A, the processor can move down the second display 430 such that the visible area 431 moves out of the transparent area 420A. On the contrary, when the user inputs an upward drag on the transparent area 420A (e.g., from the −y direction to the +y direction in FIG. 5) when the visible area 431 is positioned out of the transparent area 420A, the processor can move up the second display 430 such that the visible area 431 corresponds to the transparent area 420A. In another embodiment, when the second display 430 is moved in the left-right direction with respect to the first display 420, the processor can move the second display 430 in response to a touch drag input from the left to the right (e.g., from −x direction to +x direction in FIG. 5) or a touch drag input from the right to the left (e.g., from +x direction to −x direction in FIG. 5) in the transparent area 420A by the user.

Referring to FIG. 11, an electronic device 400 according to an embodiment may include a button 417 (e.g., the key input device 317 shown in FIG. 3A) protruding from a side of the housing 310. The electronic device 400 according to an embodiment may move the second display 430 in response to a touch by the user, similar to the electronic device of FIG. 10 (e.g., the electronic device 400 shown in FIG. 10), but may also move the second display 430 in response to operation of the button 417 by a user.

According to an embodiment, when the user presses the button 417 by a designated time period or pattern (e.g., two times), the processor may move the second display 430 such that the visible area 431 of the second display 430 is positioned at a position corresponding to the transparent area 420A of the first display 420. According to another embodiment, the processor may move the second display 430 such that the visible area 431 moves out of the transparent area 420A in accordance with another operation of the button by the user.

The operation of moving the second display 430 in response to a touch by the user in the electronic device 400 shown in FIG. 10 and the operation of moving the second display 430 in response to operation of the button 417 in the electronic device 400 shown in FIG. 11 may not be independent operations, and the electronic device 400 according to an embodiment may move the second display 430 in response to a touch by the user when the second display 430 is in the position corresponding to the transparent area (e.g., the transparent areas 420A shown in FIGS. 10 and 11) and may move the second display 430 out of the transparent area in response to operation of the button (e.g., the button 417 shown in FIG. 11).

Figure 12A:
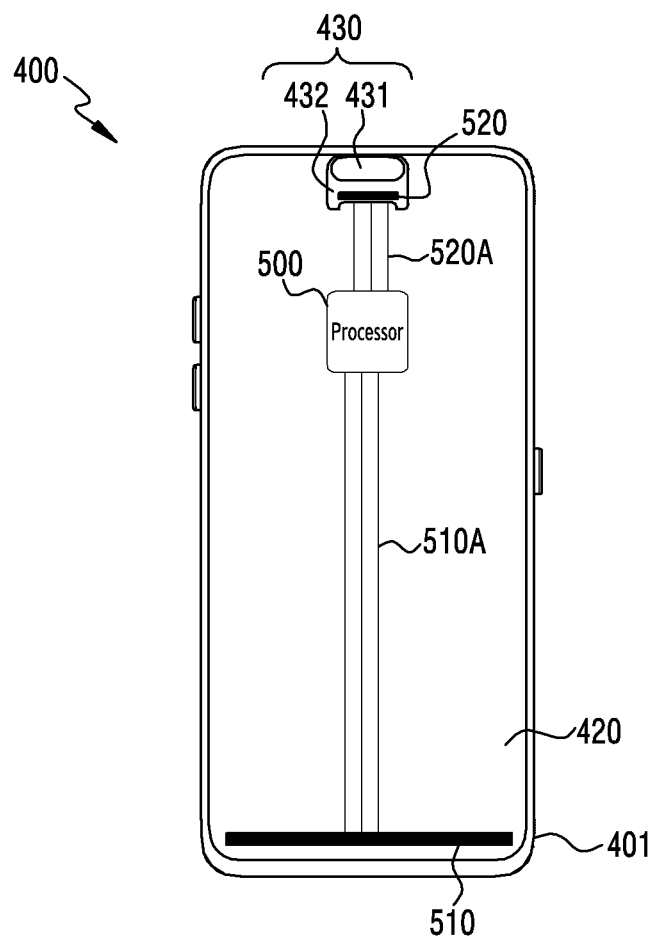
FIG. 12A is a view showing an electrical signal transmission process when full display is implemented in an electronic device according to an embodiment.
Figure 12B:
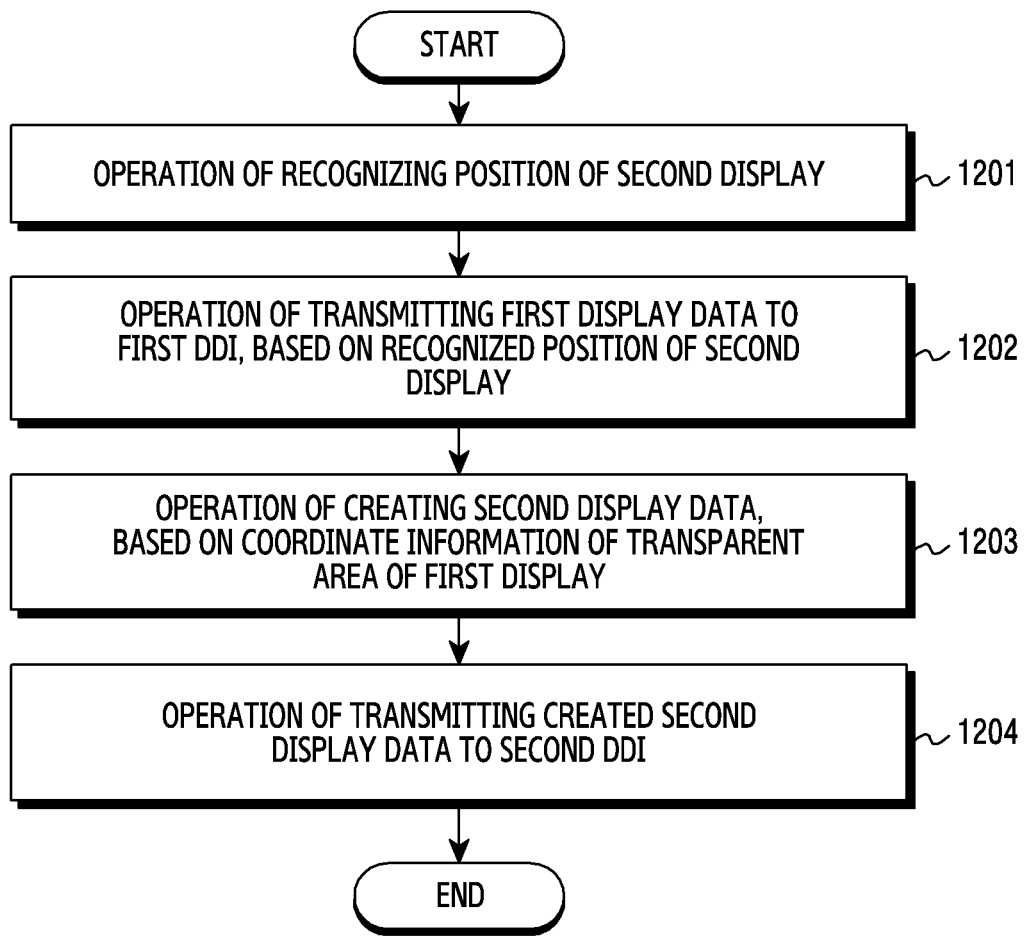
FIG. 12B is a flowchart showing an electrical signal transmission process when full display is implemented in an electronic device according to an embodiment.

FIG. 12A is a view showing an electrical signal transmission process when full display is implemented in an electronic device 400 according to an embodiment. FIG. 12B is a flowchart showing an electrical signal transmission process when full display is implemented in an electronic device according to an embodiment.

Referring to FIG. 12A, an electronic device 400 according to an embodiment may further include at least one Display Driver Integrated circuit (DDI). According to an embodiment, the DDI may be electrically connected to a processor 500 (e.g., the processor 120 shown in FIG. 1), thereby being able to operate the first display 420 and/or the second display 430, based on electrical signals from the processor.

According to an embodiment, the electronic device 400 may include a first DDI 510 for the first display 420 and a second DDI 520 disposed in the non-visible area 432 of the second display 430. The first DDI 510 may be connected with the processor 500 through a first electrical path 510A, thereby being able to operate the first display 420, based on data information signal that is input from the processor 500. The second DDI 520 may be connected with the processor 500 through a second electrical path 520A, thereby being able to operate the second display 430, based on data information signal that is input from the processor 500. According to another embodiment (not shown), the electronic device can operate the first display 420 and/or the second display 430 through one DDI electrically connected with the first display 420, the second display 430, and the processor 500. That is, when the visible area 431 of the second display 430 is positioned at a position correspond to the transparent are 420A of the first display 420, the electronic device 400 according to certain embodiments can implement a full display by operating the first display 420 and the second display 430.

Referring to FIG. 12B, the processor 500 of the electronic device 400 according to an embodiment can recognize the position relationship between the visible area 431 and the transparent area 420A by recognizing the position of the second display 430 in operation 1201. According to an embodiment, the electronic device 400 may include a Hall sensor (Hall IC, not shown) disposed close to the transparent area 420A of the first display 420. The processor 500 may be electrically connected with the Hall sensor, thereby being able to receive an output value of the Hall sensor. For example, the processor 500 can recognize whether the visible area 431 is at a position corresponding to the transparent area 420A or whether the visible area 431 is at a position out of the transparent area 420A, based on the received output value.

According to another embodiment, the processor 500 may recognize the position relationship between the visible area 431 and the transparent area 420A, based on the operation process of a driver connected to the processor 500 (e.g., the driver 440 shown in FIGS. 4 and 7A). According to an embodiment, since the driver is operated by the processor 500, the processor 500 can set a reference position between the visible area 431 and the transparent area 420A and can recognize whether the visible area 431 is at a position corresponding to the transparent area 420A or the visible area 431 is at a position out of the transparent area 420A, based on the process of operating the driver. For example, when the processor 500 sets the state, in which the visible area 431 is at a position corresponding to the transparent are 420A, as the reference position and moves down the second display 430 one time and then moves it up one time by controlling the driver, the processor 500 can determine that the visible area 431 was moved out of the transparent area 420A and then moved back to the position corresponding to the transparent area 420A.

When it is recognized that the visible area 431 is at a position corresponding to the transparent area 420A in operation 1201, the processor 500 according to an embodiment can determine that it is possible to implement a full display, and can transmit an electrical signal including first display data to the first DDI 510 through the first electrical path 510A in operation 1202. The first DDI 510 can operate the first display 420, based on first display data received from the processor 500.

The processor 500 of the electronic device 400 according to an embodiment can create second display data for operating the second display 430 in operation 1203. Images cannot be produced in the transparent area 420A of the first display 420, so an image corresponding to the position of the transparent area 420A should be shown through the second display 430 to implement the full display. According to an embodiment, the processor 500 can create second display data, based on coordinate information of the transparent area 420A of the first display 420. Accordingly, an image that should be shown to the user at the position of the transparent area 420A may be shown through the second display 430. Then a full display can be implemented as if there is no transparent area 420A in the first display 420. For example, the processor 500 can create second display data by setting reference coordinates in the first display 420 and recognize coordinate information of the transparent area 420A in reference to the reference coordinates. This may be determined based on design information of the first display 420. According to another embodiment, when the edges of the visible area 431 are outside the edges of the transparent area 420A, the processor 500 may create second display data such that the image can be displayed only in the visible area 431 corresponding to the transparent area 420A when seen from above the first display 420.

The processor 500 of the electronic device 400 according to an embodiment, in operation 1204, can transmit the second display data created in the second operation 1203 to the second DDI 520 through the second electrical path 520A. The second DDI 520 operates the second display 430, based on the second display data received from the processor 500, to implement a full display.

Figure 13A:
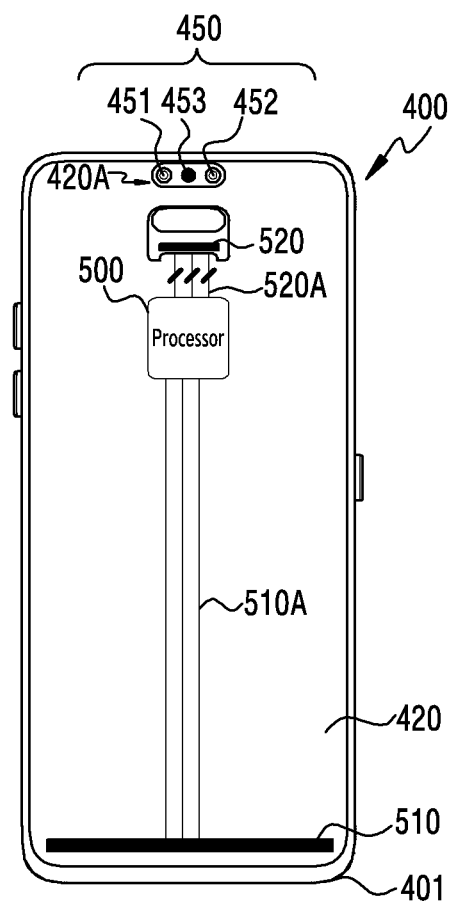
FIG. 13A is a view showing an electrical signal transmission process when a designated event occurs in an electronic device according to an embodiment.
Figure 13B:
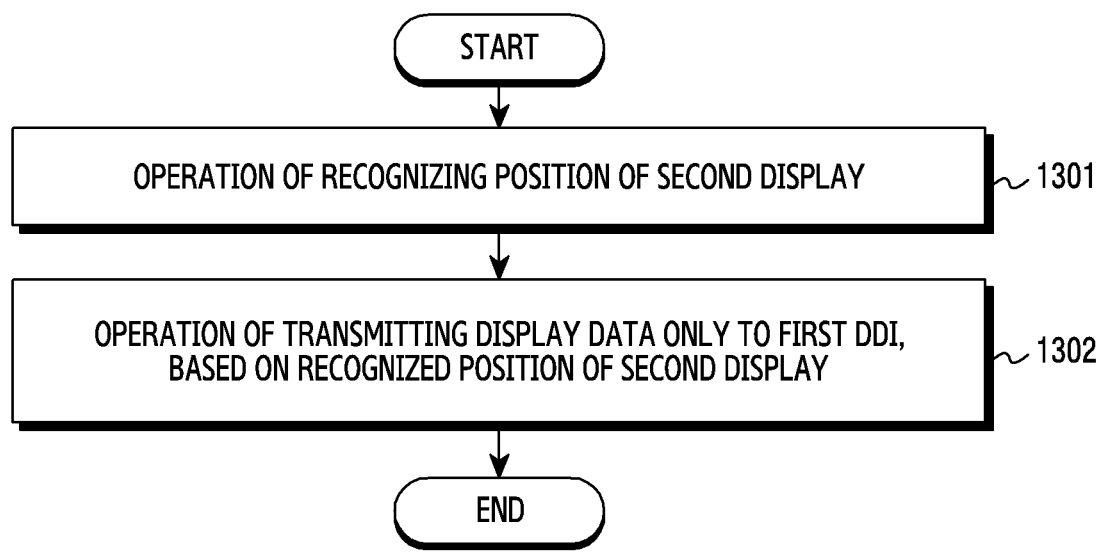
FIG. 13B is a flowchart showing an electrical signal transmission process when a designated event occurs in an electronic device according to an embodiment.

FIG. 13A is a view showing an electrical signal transmission process when a designated event occurs in an electronic device 400 according to an embodiment. FIG. 13B is a flowchart showing an electrical signal transmission process when a designated event occurs in an electronic device according to an embodiment.

Referring to FIG. 13A, when the visible area 431 of the second display 430 is at a position out of the transparent area 420A of the first display 420, an electronic device 400 according to an embodiment can operate only the first display 420 when it is required to operate a module assembly (e.g., the module assembly 450 shown in FIG. 4).

Referring to FIG. 13B, the processor 500 of the electronic device 400 according to an embodiment can recognize the position relationship between the visible area 431 and the transparent area 420A by recognizing the position of the second display 430 in operation 1301. According to an embodiment, the electronic device 400 may include a Hall sensor (Hall IC, not shown) disposed close to the transparent area 420A of the first display 420, thereby being able to recognize the position relationship between the transparent area 420*a* and the visible area 431 using the Hall sensor. According to another embodiment, the processor 500 may recognize whether the visible area 431 is at a position corresponding to the transparent area 420A or at a position not corresponding to the transparent area 420A, based on the operation process of a driver connected to the processor 500 (e.g., the driver 440 shown in FIGS. 4 and 7A). The process of recognizing the position relationship between the visible area 431 and the transparent area 420A, based on the operation process of the driver is the same as or similar to that in the electronic device 400 shown in FIG. 12A, so repeated description is omitted below.

When it is recognized that the visible area 431 is at a position not corresponding to the transparent area 420A in operation 1301, the processor 500 according to an embodiment can determine that it is impossible to implement a full display, and can transmit an electrical signal including first display data only to the first DDI 510 through the first electrical path 510A in operation 1302. The first DDI 510 can operate the first display 420, based on first display data transmitted from the processor 500. However, when the visible area 431 is at a position not corresponding to the transparent area 420A, it is not required to operate the second display 430, so the processor 500 may not transmit display data to the second DDI 520.

Figure 14:
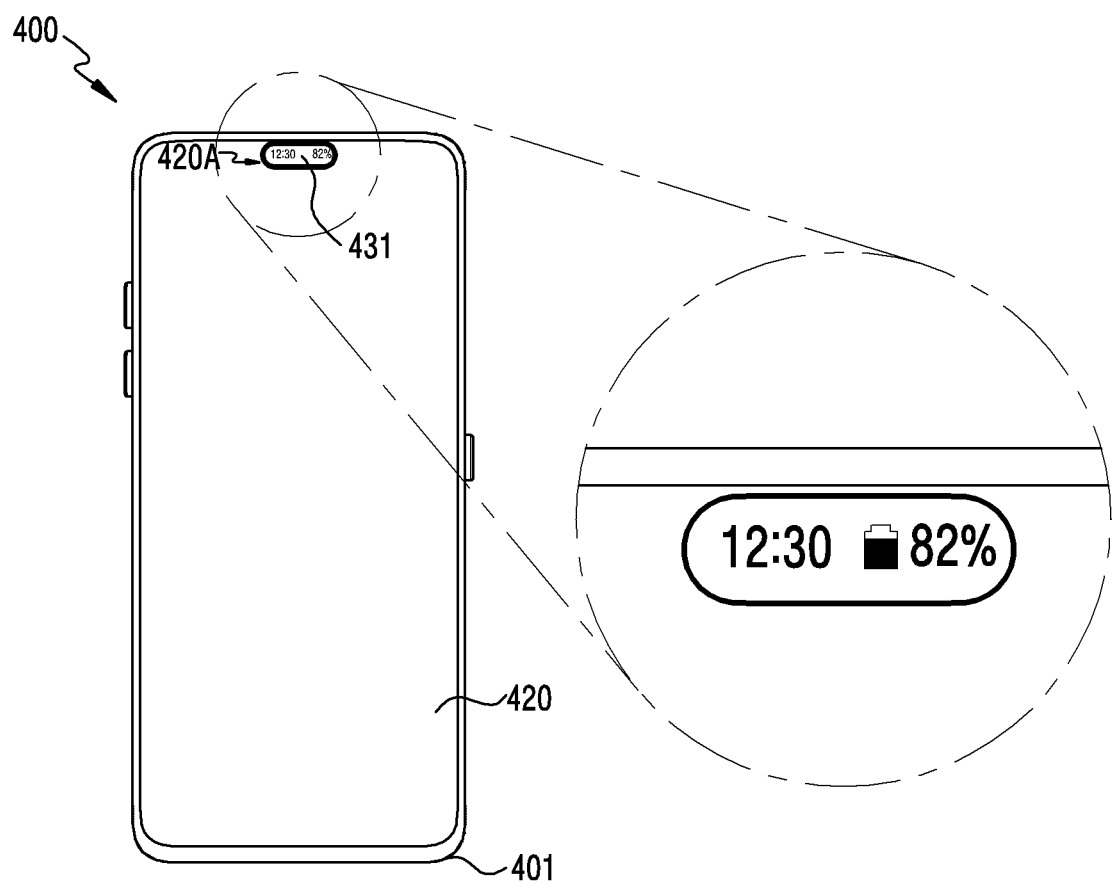
FIG. 14 is a view showing the state in which designated information is displayed through a second display in an electronic device according to an embodiment.

FIG. 14 is a view showing the state in which designated information is displayed through a second display in an electronic device 400 according to an embodiment.

Referring to FIG. 14, an electronic device 400 according to an embodiment can provide information to the user using only the visible area 431 of a second display (e.g., the second display 430 shown in FIG. 5) exposed to the outside of the electronic device 400 through the transparent area 420A. That is, the electronic device 400 according to an embodiment may operate the second display independently from the first display 420.

According to an embodiment, when the visible area 431 is positioned at a position corresponding to the transparent are 420A, the electronic device 400 can display information such as the current time, the remaining capacity of a battery, and/or a date through the visible area 431. According to another embodiment (not shown), when the visible area 431 is positioned at apposition corresponding to the transparent area 420A, the electronic device 400 can also display message reception notification, mail reception notification, and/or schedule notification. The electronic device 400 according to an embodiment displays designated information (e.g., time, the remaining capacity of a battery) through only the visible area 431 of the second display independent of the operations of the first display 420 when full display is implemented, so as to reduce power consumption of the electronic device 400. However, the embodiments above only illustrate examples of information that can be displayed on the second display, so information that can be displayed on the second display is not so limited.

Figure 15:
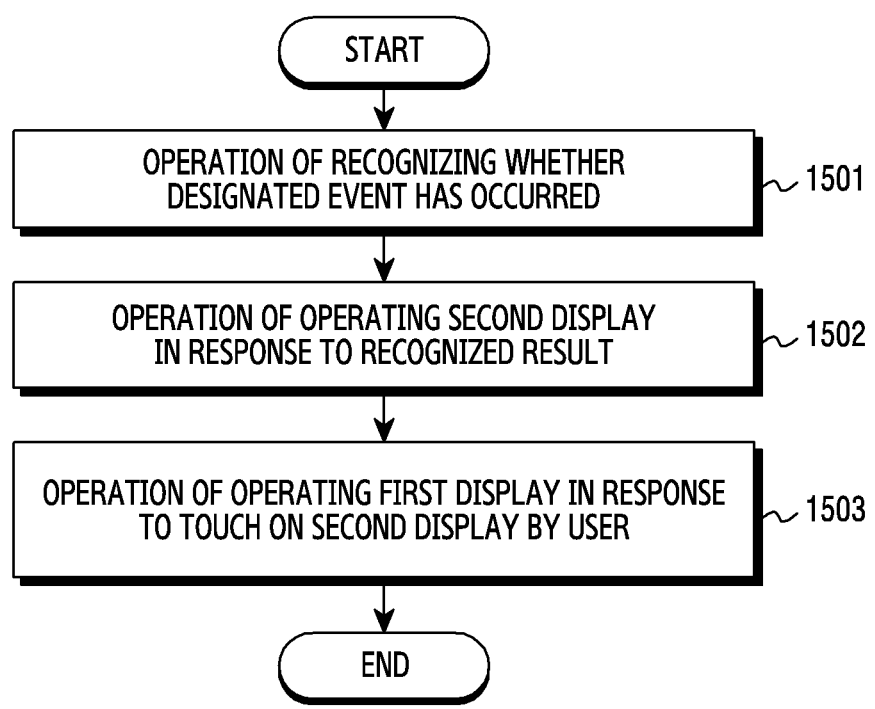
FIG. 15 is a flowchart showing a process of moving a first display in response to a touch on a second display by a user in an electronic device according to an embodiment.
Figure 16:
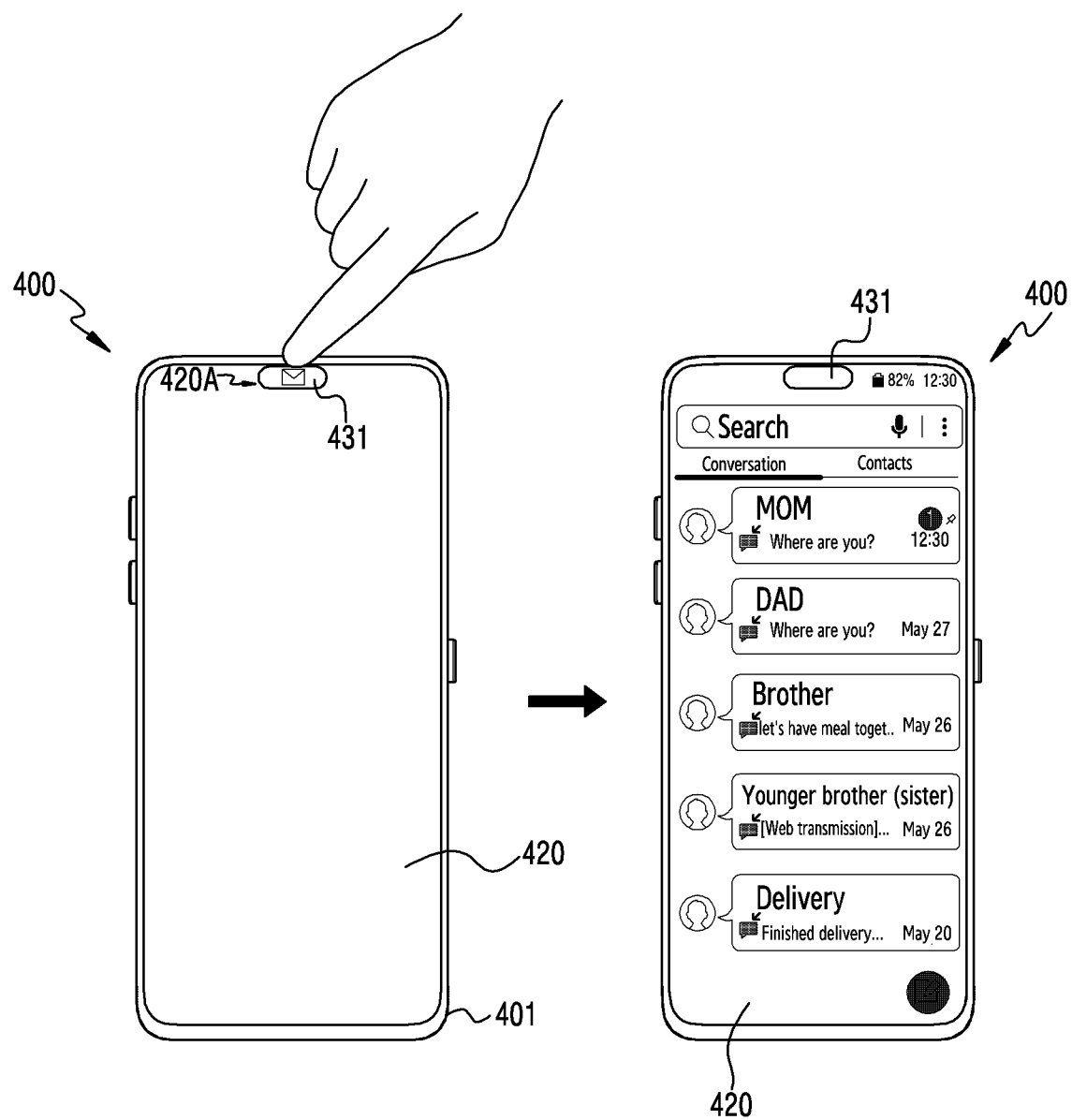
FIG. 16 is a view showing a process of moving the first display in response to a touch on a second display by a user in an electronic device according to an embodiment.

FIG. 15 is a flowchart showing a process of moving a first display in response to a touch on a second display by a user in an electronic device 400 according to an embodiment. FIG. 16 is a view showing a process of moving a first display in response to a touch on a second display by a user in an electronic device according to an embodiment.

Referring to FIGS. 15 and 16, when the visible area 431 of a second display (e.g., the second display 430 shown in FIG. 5) is positioned at a position corresponding to the transparent area 420A, a processor (e.g., the processor 120 shown in FIG. 1) of an electronic device 400 according to an embodiment, in operation 1501, can recognize whether a designated event (e.g., message reception and mail reception) has occurred.

When it is recognized that a designated event such as message reception, mail reception, and/or schedule notification has occurred in operation 1501, the processor of the electronic device 400, in operation 1502, can display designated information (e.g., time, the remaining capacity of the battery, date, message reception notification, mail reception notification, and schedule notification) in the visible area 431 by operating the second display.

In operation 1503, the processor of the electronic device 400 can recognize a touch on the visible area 431 by the user and can operate the first display 420 in response to the touch by the user. According to an embodiment, the first display includes a touch panel, so the processor of the electronic device can recognize a touch on the first display 420 by a user. The second display may also include a touch panel. That is, when the user touches the visible area 431 of the second display, the processor can recognize the touch by the user through the transparent area 420A over the visible area 431.

As an embodiment, when the user sees designated information displayed in the visible area 431 and touches the visible area 431, the processor of the electronic device 400 can display the designated information, which is related to the notification information displayed in the visible area 431, on the first display 420.

Referring to FIG. 16, according to an embodiment, message reception notification may be displayed in the visible area 431. When the user sees message reception notification and touches the visible area 431 corresponding to the transparent area 420A, the message notification displayed in the visible area 431 disappears and the received message can be displayed on the first display 420. As another example (not shown), when schedule notification is displayed in the visible area 431 and the user touches the schedule notification displayed in the visible area 431, the schedule notification displayed in the visible area 431 disappears and the detailed schedule can be displayed on the first display 420.

An electronic device (e.g., the electronic device 400 shown in FIG. 4) according to an embodiment may include: a housing (e.g., the housing 401 shown in FIG. 4); a first display (e.g., the first display 420 shown in FIG. 4) disposed in the housing and has a transparent area (e.g., the transparent area 420A shown in FIG. 4); a module assembly (e.g., the module assembly 450 shown in FIG. 4) disposed under the transparent area and being able to be shown to the outside of the housing; a second display (e.g., the second display 430 shown in FIG. 4) disposed between the first display and the module assembly and being able to cover at least a portion of the module assembly by moving with respect to the first display; a driver (e.g., the driver 440 shown in FIGS. 4, 7A, and 7B) moving the second display with respect to the transparent area; and a processor (e.g., the processor 120 shown in FIG. 1 or the processor 500 shown in FIG. 12A) moving the second display by controlling an operation of the driver in response to an operation of the electronic device.

According to an embodiment, the second display may have a first area (e.g., the visible area 431 shown in FIG. 4) in which an image is output and a second area (e.g., the non-visible area 432 shown in FIG. 4) defined around and outside the edge of the first area.

According to an embodiment, the processor may be configured to move the second display in response to occurrence of a first designated event such that the module assembly can be shown to the outside of the housing through the transparent area.

According to an embodiment, the first designated event may include a voice call by a user, a video call, iris recognition, or use of a front camera.

According to an embodiment, the processor may be configured to move the second display in response to occurrence of a second designated event such that only a part of the module assembly can be shown to the outside of the electronic device.

According to an embodiment, the second designated event may include iris recognition or use of a front camera.

According to an embodiment, the processor may be configured to move the second display in response to a touch on the transparent area of the first display by a user.

According to an embodiment, the electronic device may further include a button (e.g., the button 417 shown in FIG. 11) protruding from an edge of the housing, and the processor may be configured to move the second display in response to operation of the button by a user.

According to an embodiment, the electronic device may further include a Hall sensor (not shown) disposed close to the transparent area of the first display, and the processor may be configured to determine the position of the second display with respect to the position of the transparent area, based on an output value of the Hall sensor.

According to an embodiment, the processor may be configured to determine the position of the second display to the position of the transparent area of the first display, based on an operation of the driver.

According to an embodiment, the electronic device may further include a first DDI (e.g., the first DDI 510 shown in FIG. 12A) electrically connected with the processor and operating the first display, and a second DDI (e.g., the second DDI 520 shown in FIG. 12A) electrically connected with the processor and operating the second display.

According to an embodiment, the processor may be configured to transmit first display data information to the first DDI and transmit second display data information created based on coordinate information of the transparent area to the second DDI, based on the positions of the first area and the transparent area, when the first area is positioned to correspond to the transparent area.

According to an embodiment, the processor may be configured to transit display data information only to the first DDI, based on the positions of the first area and the transparent area, when the first area of the second display and the transparent area of the first display do not correspond to each other.

An electronic device (e.g., the electronic device 400 shown in FIG. 4) according to an embodiment may include: a housing (e.g., the housing 401 shown in FIG. 4); a first display (e.g., the first display 420 shown in FIG. 4) disposed in the housing and having a transparent area (e.g., the transparent area 420A shown in FIG. 4); a module assembly (e.g., the module assembly 450 shown in FIG. 4) disposed under the transparent area and being able to be shown to the outside of the housing; a second display (e.g., the second display 430 shown in FIG. 4) disposed between the first display and the module assembly and being able to cover at least a portion of the module assembly by moving with respect to the first display; at least one DDI (e.g., 510 and 520 in FIG. 12A) operating the first display and/or the second display; a driver (e.g., the driver 440 in FIGS. 4, 7A, and 7B) moving the second display with respect to the transparent area; and a processor electrically connected with the at least one DDI and controlling operation of the first display and/or the second display, in which the second display may have a first area (e.g., the visible area 431 shown in FIG. 4) in which an image is output and a second area (e.g., the non-visible area 432 shown in FIG. 4) defined around and outside the edge of the first area, and the processor may be configured to move the second display by controlling an operation of the driver in response to an operation of the electronic device.

According to an embodiment, the processor may be configured to recognize a touch on the transparent area by a user.

According to an embodiment, the processor may be configured to inform a user of designated information using the second display when the first area is positioned to correspond to the transparent area.

According to an embodiment, the designated information may include time, the remaining capacity of a battery, date, message reception notification, mail reception notification, and/or an alarm.

According to an embodiment, the processor may be configured to display, on the first display, information corresponding to the designated information displayed on the second display in response to the touch on the transparent area by the user.

A method of operating an electronic device (e.g., the electronic device 400 shown in FIG. 4) including a first display (e.g., the first display 420 shown in FIG. 4) having a transparent area (e.g., the transparent area 420A shown in FIG. 4), a module assembly (e.g., the module assembly 450 shown in FIG. 4) disposed under the transparent area, a second display (e.g., the second display 430 shown in FIG. 4) disposed between the transparent area and the module assembly and having a first area (e.g., the visible area 431 shown in FIG. 4) in which an image is output, and a driver (e.g., the driver 440 shown in FIG. 4) moving the second display, in accordance with an embodiment may include: recognizing the operation state of the electronic device; and moving the second display with respect to the transparent area in response to the recognition result of the operation state of the electronic device.

According to an embodiment, the method may further include: recognizing a position relationship between the transparent area and the first area; and operating the first display and/or the second display in response to the recognized position relationship between the transparent area and the first area.

In the detailed embodiment described above, the components included in the disclosure were described in singular forms or plural forms, depending on the proposed detailed embodiments. However, the singular or plural expressions were appropriately selected in the proposed situations for the convenience of description and the disclosure is not limited to the singular or plural components. Further, even if components are described in a plural form, they may be singular components, or even if components are described in a singular form, they may be plural components.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

Although detailed embodiments were described above, various modifications are possible without departing from the scope of the disclosure. Accordingly, the range of the disclosure is not limited to the embodiments and should be defined by not only the range of the claims described below, but also equivalents to the range of the claims.

What is claimed is:

1. An electronic device comprising:
    a housing;
    a first display disposed in the housing and including a transparent area;
    a module assembly disposed under the transparent area of the first display and configured to be visible to an outside of the housing;
    a second display disposed between the first display and the module assembly and configured to move under the first display such that at least a portion of the module assembly or at least a portion of the second display is visible to the outside of the housing through the transparent area of the first display;
    a driver configured to move the second display with respect to the transparent area; and
    a processor configured to move the second display using the driver based on an operation of the electronic device.

2. The electronic device of claim 1, wherein the second display comprises:
    a first area in which an image is output; and
    a second area formed along an edge of the first area.

3. The electronic device of claim 1, wherein the processor is configured to:
    in response to occurrence of a first designated event, move the second display such that the module assembly is exposed to the outside of the housing through the transparent area.

4. The electronic device of claim 3, wherein the first designated event includes a voice call by a user, a video call, iris recognition, or use of a front camera.

5. The electronic device of claim 1, wherein the processor is configured to:

in response to occurrence of a second designated event, move the second display such that only a part of the module assembly is exposed to the outside of the electronic device.

6. The electronic device of claim 5, wherein the second designated event includes iris recognition or use of a front camera.

7. The electronic device of claim 1, wherein the processor is configured to:
in response to a touch input on the transparent area of the first display, move the second display using the driver.

8. The electronic device of claim 1, further comprising a button protruding from the housing,
wherein the processor is configured to:
based on an input on the button, move the second display using the driver.

9. The electronic device of claim 1, further comprising a Hall sensor disposed adjacent to the transparent area of the first display,
wherein the processor is configured to recognize a position of the second display with respect to a position of the transparent area, based on an output value of the Hall sensor.

10. The electronic device of claim 1, wherein the processor is configured to determine a position of the second display with respect to a position of the transparent area of the first display, based on an operation of the driver.

11. The electronic device of claim 2, further comprising:
a first DDI electrically connected with the processor and configured to operate the first display; and
a second DDI electrically connected with the processor and configured to operate the second display.

12. The electronic device of claim 11, wherein the processor is configured to:
based on a determination that a position of the first area corresponds to a position of the transparent area, transmit first display data information to the first DDI and transmit second display data information created based on coordinate information of the transparent area to the second DDI.

13. The electronic device of claim 11, wherein the processor is configured to:
based on a determination that a position of the first area do not correspond to a position of the transparent area, transmit display data information only to the first DDI.

14. An electronic device comprising:
a housing;
a first display disposed in the housing and including a transparent area;
a module assembly disposed under the transparent area and configured to be visible to an outside of the housing;
a second display disposed between the first display and the module assembly and configured to move under the first display such that at least a portion of the module assembly or at least a portion of the second display is visible to the outside of the housing through the transparent area of the first display;
at least one DDI configured to operate the first display and/or the second display;
a driver configured to move the second display with respect to the transparent area; and
a processor electrically connected with the at least one DDI and configured to control an operation of the first display and/or the second display,
wherein the second display comprises a first area in which an image is output and a second area formed along an edge of the first area, and
wherein the processor is configured to move the second display using the driver based on an operation of the electronic device.

15. The electronic device of claim 14, wherein the processor is configured to detect a touch input on the transparent area.

16. The electronic device of claim 15, wherein the processor is configured to inform a user of designated information using the second display when the first area corresponds to the transparent area.

17. The electronic device of claim 16, wherein the designated information includes time, remaining capacity of a battery, date, message reception notification, mail reception notification, and/or an alarm.

18. The electronic device of claim 17, wherein the processor is configured to:
based on the touch input on the transparent area, display, on the first display, information corresponding to the designated information displayed on the second display.

19. A method of operating an electronic device that includes a first display having a transparent area, a module assembly disposed under the transparent area, a second display disposed between the transparent area and the module assembly and having a first area in which an image is output, and a driver configured to move the second display, the method comprising:
recognizing an operation state of the electronic device; and
moving the second display under the first display such that at least a portion of the module assembly or at least a portion of the second display is visible through the transparent area of the first display.

20. The method of claim 19, wherein further comprising:
recognizing a position relationship between the transparent area and the first area; and
operating the first display and/or the second display, based on the recognized position relationship between the transparent area and the first area.

* * * * *